(12) United States Patent
Sonoda et al.

(10) Patent No.: US 8,356,757 B2
(45) Date of Patent: Jan. 22, 2013

(54) RFID TAG AND MANUFACTURING METHOD THEREOF, IMPEDANCE-ADJUSTING METHOD AND RESIN SHEET AND MANUFACTURING METHOD THEREFOR

(75) Inventors: Ryuta Sonoda, Tokyo (JP); Koji Ikawa, Tokyo (JP); Kazuhiko Niwano, Tokyo (JP); Kouji Koganezawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 11 days.

(21) Appl. No.: 13/018,131

(22) Filed: Jan. 31, 2011

(65) Prior Publication Data

US 2011/0168788 A1    Jul. 14, 2011

Related U.S. Application Data

(63) Continuation of application No. PCT/JP2009/063673, filed on Jul. 31, 2009.

(30) Foreign Application Priority Data

Aug. 1, 2008   (JP) ................................. 2008-200238
Nov. 6, 2008   (JP) ................................. 2008-285843

(51) Int. Cl.
*G06K 19/06*    (2006.01)
(52) U.S. Cl. ........................................ 235/492; 235/487
(58) Field of Classification Search .................. 235/492, 235/487; 361/737, 764; 340/572.7
See application file for complete search history.

(56) References Cited

U.S. PATENT DOCUMENTS

| | | | |
|---|---|---|---|
| 6,545,647 B1 | 4/2003 | Sievenpiper et al. | |
| 6,552,696 B1 | 4/2003 | Sievenpiper et al. | |
| 7,330,161 B2 | 2/2008 | Matsugatani et al. | |
| 7,339,550 B2 | 3/2008 | Hayama et al. | |
| 2002/0185218 A1* | 12/2002 | Nakamichi | 156/272.2 |
| 2005/0064159 A1* | 3/2005 | Amou et al. | 428/209 |
| 2006/0044212 A1 | 3/2006 | Wang et al. | |
| 2006/0132312 A1 | 6/2006 | Tavormina | |
| 2008/0129511 A1 | 6/2008 | Yuen et al. | |
| 2010/0035159 A1* | 2/2010 | Yoshino et al. | 429/317 |
| 2010/0053013 A1 | 3/2010 | Konishi et al. | |
| 2010/0173108 A1* | 7/2010 | Nagao et al. | 428/36.9 |

FOREIGN PATENT DOCUMENTS

| | | |
|---|---|---|
| JP | 2002-510886 | 4/2002 |
| JP | 2003-529259 | 9/2003 |
| JP | 2004-535722 | 11/2004 |
| JP | 2007-104211 | 4/2007 |
| JP | 2009-153089 | 7/2009 |
| WO | WO-99/50929 | 10/1999 |
| WO | WO-2008/062562 A1 | 5/2008 |
| WO | WO-2008/136530 A1 | 11/2008 |

OTHER PUBLICATIONS

Gao, et al. "Ultrathin low cost Electromagnetic Band Gap (EBG) materials as UHF RFID tag substrate" Electronic Materials and Packaging, 2006, pp. 1-4.

(Continued)

*Primary Examiner* — Ahshik Kim
(74) *Attorney, Agent, or Firm* — Foley & Lardner LLP

(57) ABSTRACT

An RFID tag has an antenna element including an antenna substrate equipped with an IC chip and a conductor pattern, an artificial medium, and a first insulation layer sandwiched between the antenna element and the artificial medium. The artificial medium has a single first conductive element placed on an upper surface of a dielectric layer and a single second conductive element placed on a lower surface of the dielectric layer.

10 Claims, 17 Drawing Sheets

OTHER PUBLICATIONS

Gao, et al. "Low Cost Passive UHF RFID Packagaging with Electromagnetic Band Gap (EBG) substrate for Metal Objects" Electronic Components and Technology Conference, 2007, pp. 974-978.

Gao, et al. "Passive UHF RFiD with Ferrite Elctromagnetic Band Gap (EBG) Material for Metal Objects Tracking" Electronic Components and Technology Conference, 2008, pp. 1990-1994.

International Search Report in PCT/JP2009/063673 dated Nov. 17, 2009.

Sim, et al. "Design of Novel Dipole-Type Tag Antennas using Electromagnetic Bandgap (EBG) Surface for Passive RFID Applications", Antennas and Propagation International Symposium, 2007, pp. 1333-1336.

Ukkonen, et al. "Patch Antenna With EBG Ground Plane and Two-Layer Substrate for Passive RFID of Metallic Objects" Antennans and Propagation Society International Symposium, 2004, vol. 1, pp. 93-96.

Supplementary European Search Report EP 09 80 3048 dated Oct. 9, 2012.

* cited by examiner

FIG. 6
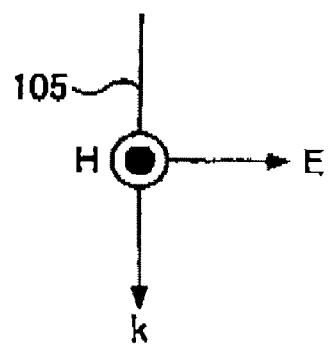
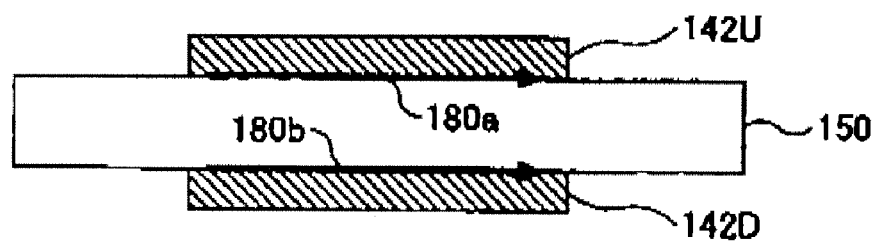
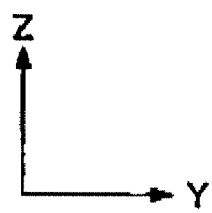

RFID TAG AND MANUFACTURING METHOD THEREOF, IMPEDANCE-ADJUSTING METHOD AND RESIN SHEET AND MANUFACTURING METHOD THEREFOR

TECHNICAL FIELD

The present invention relates to an RFID tag and manufacture thereof and, more particularly, to an RFID tag having an artificial medium and manufacture thereof.

BACKGROUND ART

Attention has recently been paid to an RFID (Radio Frequency Identification) technique as a noncontact authentication technique utilizing an electromagnetic field and radio waves. According to the RFID technique, it is possible to perform authentication of a body, or the like, by reading information stored in an RFID tag (a generic designation of a medium that exchanges information by use of the RFID technique, like an IC tag and a noncontact IC card) having an antenna element in which there is mounted an IC chip worked in the form of a tag or a label through use of a reader. An UHF band and a 2.45-GHz band are currently, predominantly utilized for a radiowave RFID.

In order to enhance a characteristic, an RFID tag using a so-called "artificial medium" has recently been proposed (see; for instance, Non-Patent Document 1).

RELATED ART DOCUMENTS

Non-Patent Documents
Non-Patent Document 1: Dong-Uk Sim, Dong-Ho Kim, Jae-Ick Choi, Hyung-Do Choi, "Design of Novel Dipole-Type Tag Antennas using Electromagnetic Bandgap (EBG) Surface for Passive RFID Application," IEEE International Symposium on Antennas and Propagation, p 1333, 2007

SUMMARY OF THE INVENTION

Problem that the Invention is to Solve

In order to miniaturize such an RFID tag, a demand exists for a decrease in thickness of the tag.

However, when an RFID tag is made thin and disposed on metal, an antenna element accommodated in the RFID tag approaches the metal that is a mount target where the tag is to be mounted. In particular, when a distance between the RFID tag and the metal comes to a one-tenth part or less of a wavelength $\lambda$, the RFID tag fails to properly operate. Conceivable two reasons for this are as follows:

(i) A wave reflected from the metal plate and a radiation wave exiting from the antenna become out of phase to each other, thereby cancelling each other.

(ii) Capacitive coupling arises between the antenna element and the metal, thereby greatly changing an input impedance. Put another way, a decrease in radiation resistance and an error in reactance (a phase angle of an input impedance) occur.

To address these problems, several proposals have already been made. First, use of a so-called "artificial medium" has been put forward to cope with the problem of (i) as described in connection with Non-Patent Document 1. The "artificial medium" is also called a "meta-material" and is a generic designation of mediums that exhibit material characteristics, which will not be yielded in a natural world (an effective relative permittivity and an effective relative permeability), by arranging inclusions, like metal, at a minute level with high accuracy. As a result of use of such an artificial medium, it becomes possible to form an in-phase reflector in an RFID tag and make the reflected wave in phase with the radiation wave. However, when a related art artificial medium, such as that reported thus far, is used, there arises a problem of an inability to make the REID tag sufficiently thin.

Meanwhile, in relation to the problem (ii), there have been taken countermeasures for optimizing an input impedance by controlling the antenna element itself. However, such a method is fraught with an increase in the variety of types of RFID tags and complication of the RFID tag, which in turn poses difficulty in unification of standards. There arises another problem of an increase in the cost of manufacture of an RFID tag and deterioration of productivity. Moreover, the great majority of the related art methods for optimizing an input impedance have been applied to an antenna like a general resonant antenna. In this case, an imaginary part of an impedance is handled as zero. Therefore, impedance control is relatively easy. Meanwhile, in the case of an RFID tag for an RFID purpose, an input impedance includes an imaginary part. A reality is that examples which have been made to control such a complicate impedance thus far are very few and that effectiveness of impedance control has not yet been verified sufficiently.

As mentioned above, it is extremely difficult to simultaneously solve both problems (i) and (ii). For this reason, an RFID tag that is compact (assumes a shape of a thin film) and that excellently operates has not yet been realized. Great demand exists for such a compact RFID tag.

The RFID tag of the present invention has been conceived in light of the circumstance and aims at being able to be thinned and appropriately operate even when brought closer to metal that is a mount target.

Means for Solving the Problem

An RFID tag in one mode of the present invention includes: an antenna element having an antenna substrate equipped with an IC chip and a conductor pattern; an artificial medium; and a first insulation layer interposed between the antenna element and the artificial medium, wherein the artificial medium has a single first conductive element placed on an upper surface of a dielectric layer and a single second conductive element placed on a lower surface of the dielectric layer.

A method for manufacturing an RFID tag in one mode of the present invention includes a step of providing an antenna element having an antenna substrate equipped with an IC chip and a conductor pattern, a step of providing an artificial medium, and a step of stacking the antenna element and the artificial medium by way of a first insulation layer, wherein the artificial medium has a single first conductive element placed on an upper surface of a dielectric layer and a single second conductive element placed on a lower surface of the dielectric layer; the method includes: a step of controlling a ratio of a length Lt of the first conductive element of the artificial medium to a width Wt of the same (Wt/Lt), thereby controlling fluctuations in a real part and an imaginary part of an input impedance occurred in an operating frequency band of the RFID tag so as to fall within a predetermined range; and a step of controlling a ratio (Lt/La) of an entire length La of the antenna element to the length Lt of the first conductive element of the artificial medium, thereby controlling a phase angle of the input impedance achieved in the operating frequency band of the RFID tag so as to fall within a predetermined range.

An REID tag of another mode of the present invention includes: an antenna element having a substrate provided with an IC chip and an antenna pattern; an artificial medium having a single first conductive element placed on an upper surface of a dielectric layer and a single second conductive element placed on a lower surface of the dielectric layer; a first insulation layer interposed between the antenna element and the artificial medium; and a second insulation layer placed on an opposite side of the artificial medium with respect to its side equipped with the antenna element, wherein a ground plane is formed on an opposite surface of the second insulation layer with respect to its surface facing the artificial medium.

A method for controlling an impedance of an antenna element of one mode of the present invention is a method for controlling an impedance of an antenna element of an RFID tag, in which the RFID tag has an artificial medium interposed between first and second insulation layers and the antenna element provided on an opposite side of the first insulation layer with respect to its side provided with the artificial medium, wherein the artificial medium has first and second conductive elements with a dielectric layer sandwiched therebetween; and the method includes a step of controlling an impedance by changing dimensions of the first or second conductive element.

A resin sheet of one mode of the present invention includes a relative permittivity of 13 or more and a dielectric loss tangent of 0.001 or less.

A method for manufacturing a resin sheet of one mode of the present invention includes a step of preparing a thermoplastic resin; a step of preparing filler particles; a step of kneading the thermoplastic resin and the filler particles; and a step of pressurizing the thermoplastic resin and the filler particles that have been kneaded.

Advantage of the Invention

An RFID tag of the present invention can be thinned and can operate appropriately even when brought closer to metal.

BRIEF DESCRIPTION OF THE DRAWINGS

FIG. 6 is an enlarged cross sectional view of the artificial medium shown in FIG. 3, showing direction's of electric currents developing in conductive elements at a low frequency.

FIG. 1B is a plot showing a relationship between a frequency and an imaginary part of an input impedance in connection with a width Wp of each of parasitic elements.

MODE FOR IMPLEMENTING THE INVENTION

A mode of the present invention is hereunder described by reference to the drawings.
(First RFID Tag)

Figure 1:
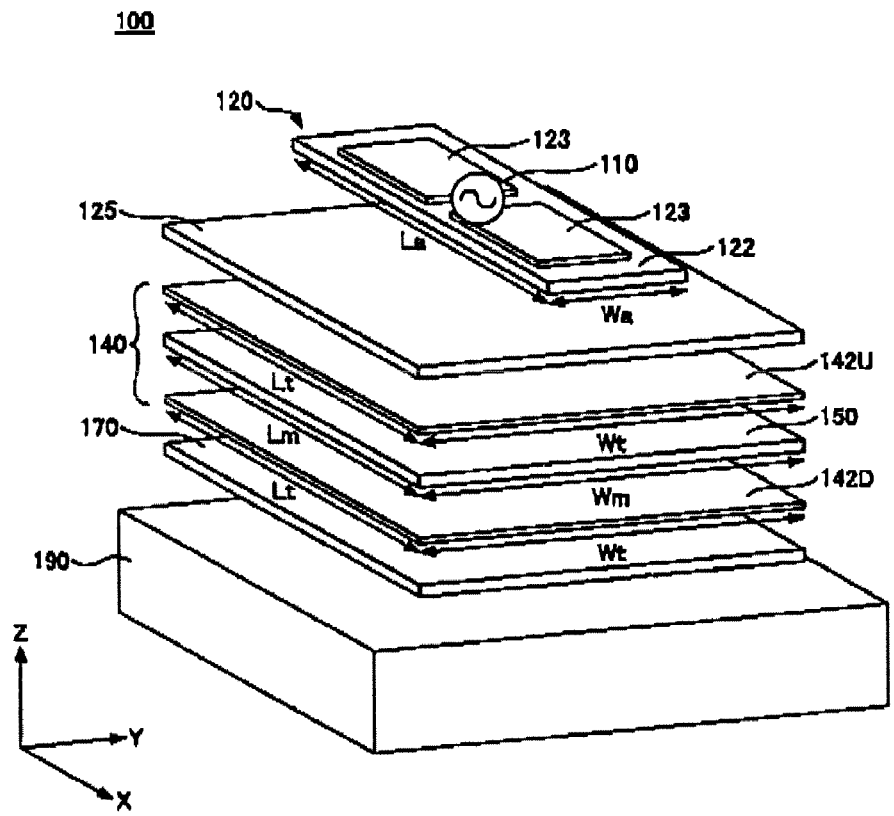
FIG. 1 is a view showing an exemplary exploded schematic diagram of an RFID tag of the present invention.
Figure 2:
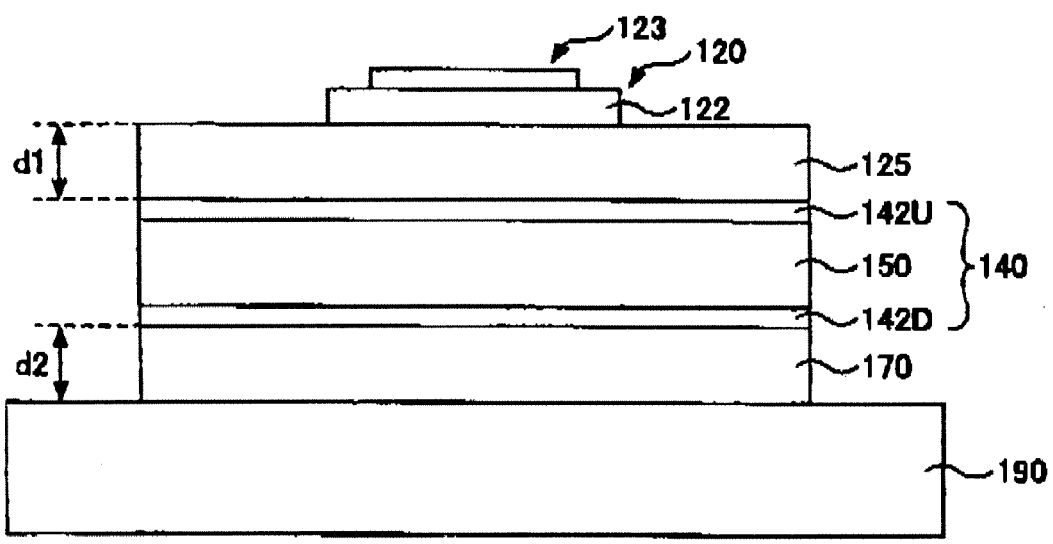
FIG. 2 is a schematic, cross sectional view of the RFID tag shown in FIG. 1.
Figure 3:
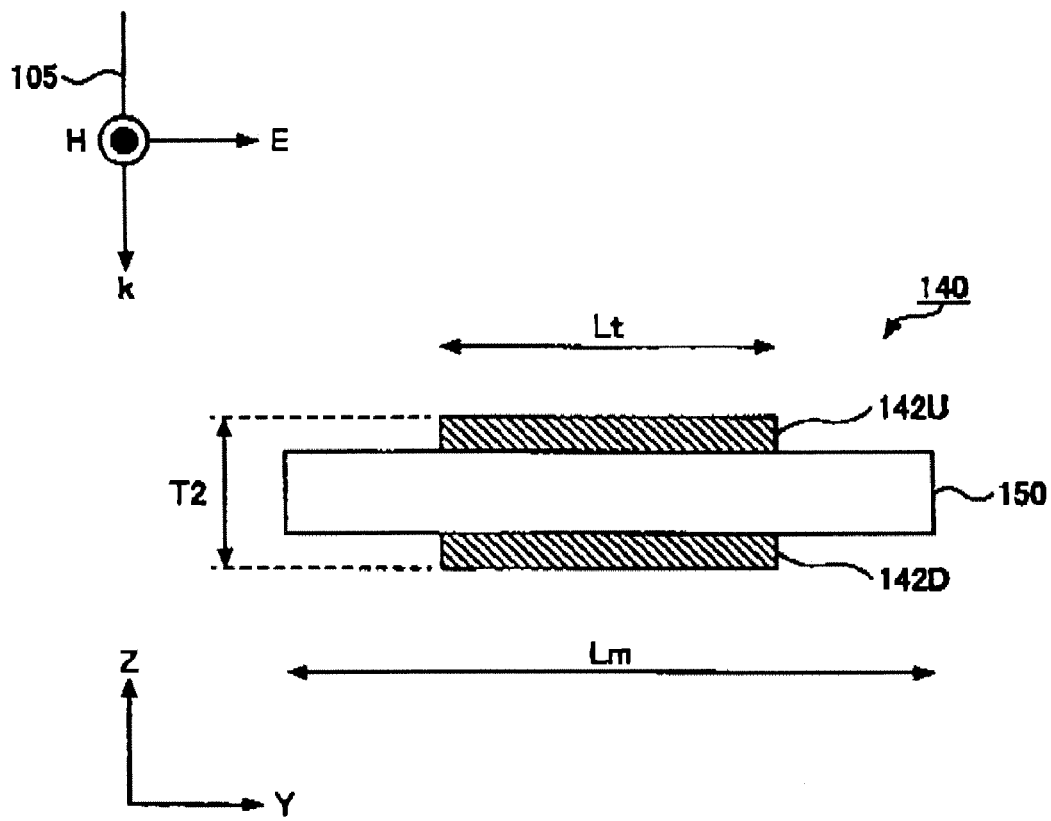
FIG. 3 is a perspective view schematically showing an example configuration of an artificial medium utilized in the RFID tag of the present invention.

FIG. 1 is an oblique perspective view showing a configuration of an RFID tag of the present invention. FIG. 2 is a cross sectional view showing a configuration of the RFID tag shown in FIG. 1. FIG. 3 is a cross sectional view showing an example configuration of an artificial medium used in the RFID tag of the present invention.

An RFID tag 100 of the present invention includes an antenna element 120 having an IC chip 110, a first insulation layer 125, an artificial medium 140, and a second insulation layer 170. Reference numeral 190 designates a metal plate (or a ground plane) that is a mount target where the RFID tag 100 of the present invention is to be mounted. The second insulation layer 170 and the mount target 190 may also be omitted.

The antenna element 120 has a substrate or sheet 122 made of a resin, or the like, (hereinafter referred to as an "antenna substrate") and conductive antenna patterns 123 to be placed on the sheet 122. The antenna element 120 measures; for instance, a width Wa (a dimension achieved in a direction Y in the drawing) of 30 mm×a length La (a dimension achieved in a direction X in the drawing) of 100 mm.

The first insulation layer 125 is formed from; for instance, a low dielectric resin, or the like.

The artificial medium 140 includes a first conductive element 142U, a second conductive element 142D, and a dielectric layer 150 interposed therebetween. As shown in FIGS. 1 through 3, it is preferable that the first conductive element 142U and the second conductive element 142D should assume the same dimension and shape. In the embodiment shown in FIGS. 1 through 3, when viewed in a direction parallel to a thicknesswise direction of the artificial medium 140 (i.e., a direction Z in FIGS. 1 and 3), the first conductive element 142U and the second conductive element 142D are placed on respective sides of the dielectric layer 150 so as to be aligned to each other. However, a correlation between the first conductive element 142U and the second conductive element 142D is not limited to the embodiment. Specifically, in relation to the size and/or shape of these conductive elements, there may also be a difference in size; for instance, the first conductive element is larger or smaller than the second conductive element. Further, when viewed in the direction Z in FIGS. 1 and 3, a positional difference can exist between the first conductive element and the second conductive element (especially, in terms of a center position). Even when a difference exists in terms of a center position, an overlap between the first conductive element and the second conductive element must account for 50% or more of respective areas of the first and second conductive elements in order to exhibit the performance of the artificial medium. Further, as shown in FIGS. 1 and 2, the dielectric layer 150 of the artificial medium 140, the first conductive element 142U, and the second conductive element 142D can also assume the same dimension in height and width (i.e., Lt=Lm and Wt=Wm). In this case, an upper principal surface of the dielectric layer 150 is entirely covered with the first conductive element 142U, and a lower principal surface of the dielectric layer 150 is entirely covered with the second conductive element 142D.

Like the first insulation layer 125, the second insulation layer 170 is formed from; for instance, a low dielectric resin, or the like. The first insulation layer 125 and the second insulation layer 170 can also be formed from the same material or different materials.

No limits are particularly imposed on an extending direction (a longitudinal direction) of the antenna patterns 123 of the antenna element 120 to be placed on a surface (an X-Y plane shown in FIG. 1) of the first insulation layer 125. The extending direction can also be oriented in a direction parallel to; for instance, the direction X or the direction Y. Alternatively, the extending direction can also be oriented in a direction turned through 45° counterclockwise with respect to the direction Y or a direction turned through 45° clockwise with respect to the direction Y (the extending direction of the antenna pattern 123 in the embodiment shown in FIG. 1 is parallel to the direction X).

A characteristic of the RFID tag 100 of the present invention configured as mentioned above is now described.

As mentioned above, when the antenna element included in the RFID tag is brought considerably closer to a mount target, like a metal plate, with a view toward miniaturizing the RFID tag (when a distance between the antenna element and the metal plate has come to a one-tenth part or less of free space wavelength λ), (i) a wave reflected from the metal plate and a radiation wave from the antenna become out of phase to each other, thereby cancelling each other; and (ii) capacitive coupling occurs between the antenna element and the target where metal is to be mounted, so that a great change occurs in input impedance; in other words, a decrease in radiation resistance and an error in reactance (a phase angle of an input impedance) occur, whereby the RFID tag becomes unable to properly operate.

In order to address the problems, a proposal for coping with the problem (i) is to form an in-phase reflector in an RFID tag by use of an artificial medium, thereby bringing the reflected wave in phase with the radiation wave. Meanwhile, a countermeasure has already been implemented with respect to the problem (ii) by adjusting the configuration of the antenna element itself, to thus optimize an input impedance.

However, the way to address the problem (i) is fraught with occurrence of a problem of the inability to make the REID tag sufficiently thin if a related art artificial medium, such as that reported thus far, is used. Further, the way to address the problem (ii) is fraught with occurrence of a problem of diversification and complication of types of RFID tags, which in turn poses difficulty in unifying standards. There is also another problem of an increase in manufacturing cost of the RFID tag and deterioration in productivity. Moreover, great majority of related art methods for optimizing an input impedance have hitherto been applied to antennas, like common resonance antennas. In this case, an imaginary part of an impedance is taken as zero, and hence impedance control is comparatively easy. Meanwhile, in the case of an RFID tag for an RFID purpose, the input impedance includes an imaginary part. Examples which have been made to control such a complicate impedance thus far are very few, and there still exists a problem of effectiveness of impedance control being not verified sufficiently.

By virtue of assiduous studies and researches conducted by the present inventors with regard to original means for miniaturizing an RFID tag, the inventors found that an input impedance of an RFID tag can be set so as to fall within an appropriate range without involvement of any particular change in a configuration of antenna elements, by means of (1) using a new artificial medium; and (2) controlling a configuration of such an artificial medium; specifically, a dimension of a first conductive element and a dimension of a second conductive element and a permittivity and thickness of a dielectric substance making up the first insulation layer 125 interposed between the antenna element 120 and the artificial medium 140, thereby controlling a phase angle of the input impedance in an operating frequency band of the RFID tag and fluctuations in a real part and an imaginary part of the input impedance.

In this case, the means (1) and (2) make it possible to form an in-phase reflector within the RFID tag and to freely control the input impedance. Accordingly, there can be acquired an RFID tag that operates properly even when an antenna element included in the RFID tag is brought closer to a target like metal, and the REID tag can be made thin.

More detail explanations are hereunder provided for technical significance and advantages of the characteristics (1) and (2).

(About the Characteristic 1)

Before an explanation is given to the artificial medium 140 used in the present invention, a configuration of a related art artificial medium is explained for comparison purpose.

Figure 4:
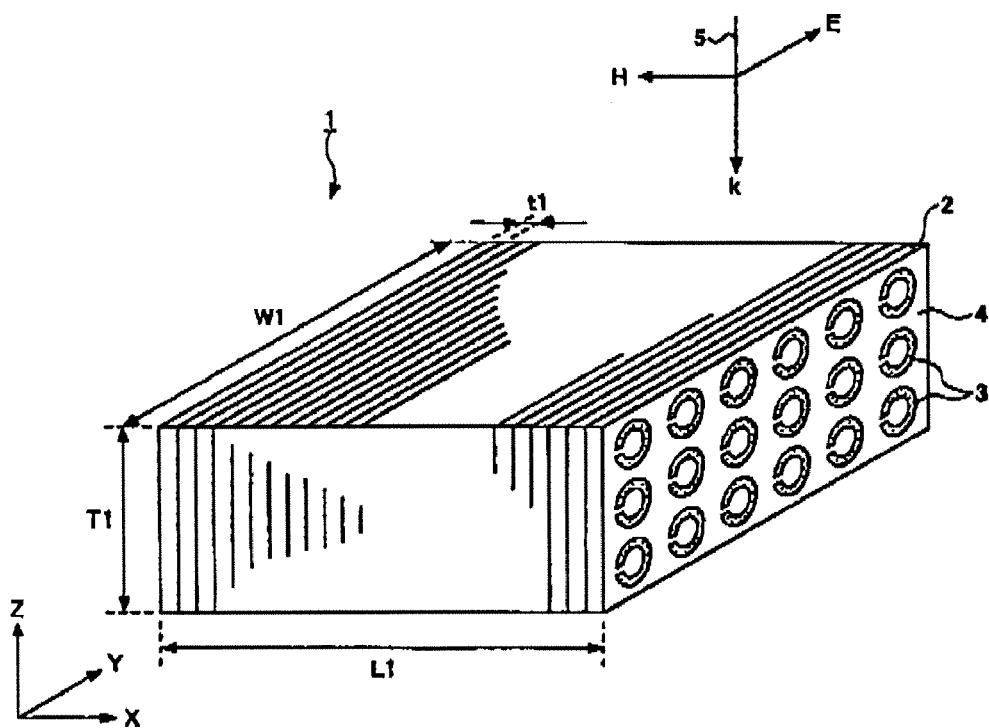
FIG. 4 is an oblique perspective view schematically showing an example configuration of a related art artificial medium.

FIG. 4 shows a typical example configuration of a related art artificial medium 1. As shown in FIG. 4, the related art artificial medium 1 measures a length L1, a width W1, and a thickness T1. The related art artificial medium 1 is formed by stacking a plurality of dielectric layers 2 each of which has a thickness t1, in a longitudinal direction of the artificial medium 1 (i.e., a direction X in the drawing). Moreover, each of the dielectric layers 2 has a sequence pattern including split rings 3 serving as inclusions, in a conductive plane 4 (a Y-Z plane in the drawing). Each of the split rings 3 has a separated portion 6 at a position closer to the reader of the drawing (i.e., a negative side along a direction Y) (see FIG. 5A).

Figure 5A:
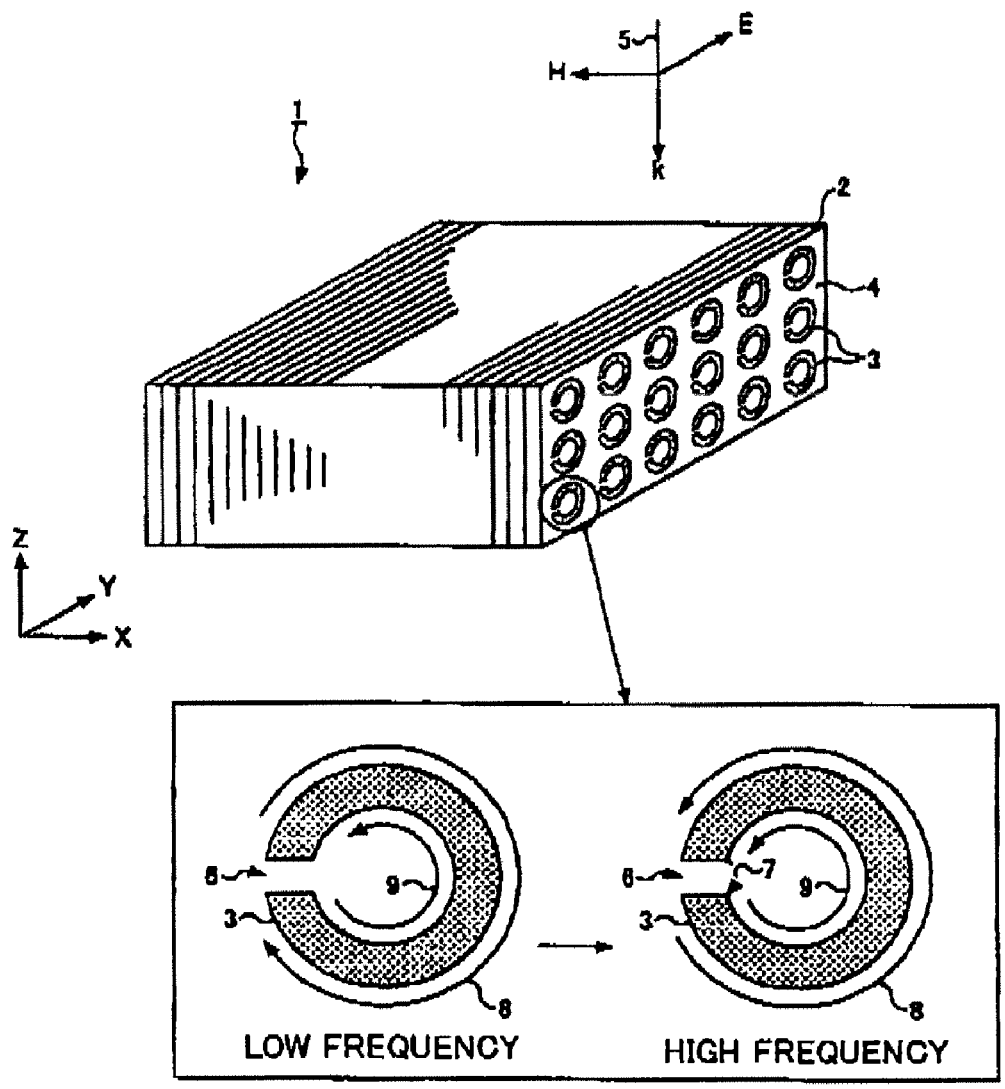
FIG. 5A is a view schematically showing a principle of an increase in effective relative permeability of the related art artificial medium.
Figure 5B:
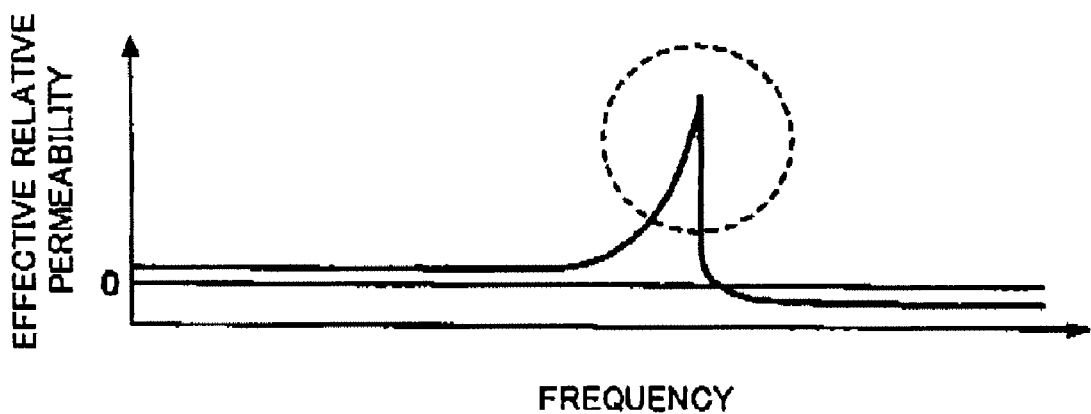
FIG. 5B is a view schematically showing a principle of an increase in effective relative permeability of the related art artificial medium.

A characteristic of the related art artificial medium 1 is now described by reference to FIGS. 5A and 5B. FIGS. 5A and 5B show a principle of an increase in effective relative permeability of the related art artificial medium 1.

When a low frequency electromagnetic wave 5 propagating in the direction Z (a direction E of an electric field is in the direction Y, and a direction H of a magnetic field is in the direction X) is caused to enter the artificial medium 1, electric currents flow in opposite directions on an outer periphery side and an inner periphery side of each of the split rings 3. Specifically, an electric current 8 develops in a clockwise direction on the outer periphery side of each of the split rings 3, and an electric current 9 develops in a counterclockwise direction on the inner periphery side of each of the split rings 3. Accordingly, in this case, magnetic field developing from the electric currents cancel each other, and an increase in effective relative permeability does not occur on the whole. However, if a frequency gradually increases, the electric current flowing into the split rings 3 exceed the separated portions 6 at a certain frequency (a resonance frequency), a displacement current 7 develops in the separated portions 6. As a result, the electric current 8 and the electric current 9 flow in the counterclockwise direction on both the inner periphery and the outer periphery of each of the split rings 3. Thus, the electric current flowing through the split rings 3 work as a loop current. As a result of occurrence of such a loop current, a magnetic flux passing through the artificial medium is strengthened, whereby effective relative permeability of the artificial medium can be apparently enhanced.

Influence of a change in frequency on the effective relative permeability of the artificial medium 1, such as that mentioned above, is represented as illustrated in FIG. 5B. In the graph, a noticeable increase arises in effective relative permeability in a circled frequency domain for reasons of the foregoing principle.

As mentioned above, when the artificial medium 1 is used, the effective relative permeability can be enhanced. It thereby becomes possible to let the artificial medium 1 act as an in-phase reflector, thereby enabling an increase in impedance of a device, such as the RFID tag.

In order to let such an artificial medium 1 yield an advantage of an increase in effective relative permeability, such as that mentioned above, the artificial medium 1 must be made in such a way that the conductive plane 4 of the split rings 3 is positioned in parallel to a direction of incidence of the electromagnetic wave 5. The reason for this is that, in order to exhibit an increase in effective relative permeability of the artificial medium by utilization of frequency dependence of a flowing direction of an electric current, such as that mentioned above, the conductive plane 4 of the inclusions 3 must be positioned so as to cross an amplitude direction H of a magnetic field of the incident electromagnetic wave 5. Since such a relative relationship must exist between the direction H of the magnetic field of the electromagnetic wave 5 and the conductive plane 4, the dielectric layers 2 are stacked along a lengthwise direction (the direction X in FIG. 4) of the completed artificial medium 1 during formation of the related art artificial medium 1. Therefore, in normal times, no match exists between the direction of a receiving plane of the artificial medium 1 (i.e., a plane (an X-Y plane) perpendicular to the direction of incidence of the electromagnetic wave) and the direction of the conductive plane 4 of the dielectric layer 2.

In this case, in order to acquire the artificial medium 1 having the length L1, an extremely large number of dielectric layers 2 must be stacked. For instance, in the case of a dielectric layer having a thickness of about 1 mm, as many as 100 dielectric layers must be stacked to produce an artificial medium having a length L1 of 10 cm. Consequently, there arises a problem of an extreme increase in manufacturing cost of the artificial medium.

Moreover, at least one inclusion must be placed in each of the dielectric layers 2 making up the artificial medium 1. Therefore, as a matter of course, the thickness T1 of the artificial medium 1 (a length achieved in the direction Z in FIG. 4) cannot be made smaller than the dimension of the inclusion (the inclusion usually measures 5 to 20 mm or thereabouts in a normal microwave band).

As above, the related art artificial medium 1 is fraught with a problem of difficulty being encountered in miniaturization or slimming down of the medium.

On the contrary, as shown in FIG. 3, the artificial medium 140 used in the present invention is configured by placing the single conductive element 142U on the upper surface of the dielectric layer 150 and the single conductive element 192D on the lower surface of the same. In the illustrated embodiment, each of the conductive elements 142U and 142D assumes a square shape measuring Lt per side. The dimension and the shape are mere illustrations. Further, no limit is imposed on the thickness of the conductive elements 142U and 142D. In the embodiment shown in FIG. 3, the thickness is 5 to 20 μm, or thereabouts. No limit is imposed on a material of the conductive elements 142U and 192D, so long as the material exhibits electric conductivity. The conductive elements are made of metal; for instance, copper.

The artificial medium 140 configured as mentioned above (hereinafter referred to also as an "artificial medium of the present invention") exhibits characteristic behavior, such as that provided below.

As described by reference to FIGS. 5A and 5B, the related art artificial medium 1 is arranged such that the conductive plane 4 of each of the dielectric layers 2 becomes parallel to a propagating direction "k" of an electromagnetic wave. The reason for this is that a current loop is not formed in the artificial medium at a resonance frequency band unless the artificial medium is arranged as mentioned above. Accordingly, in normal times, a match does not exist between a plane (hereinafter referred to as a "receiving plane") perpendicular to the propagating direction of the electromagnetic wave of the artificial medium and the conductive plane.

On the contrary, in the present invention, the artificial medium 140 is configured in such a way that both principal surfaces of the dielectric layer 150 in which the conductive elements are disposed are arranged so as to become perpendicular to the propagating direction "k" of the incoming electromagnetic wave 105 (see FIG. 3). Accordingly, a match exists between the receiving plane of the artificial medium 140 that receives the electromagnetic wave 105 and the conductive plane (both principal surfaces on which there are disposed the conductive elements 142U and the 142D).

In the case of such an arrangement, it is possible to cause the conductive plane of the dielectric layer 150 in the artificial medium 140 to act as a receiving plane. Therefore, when compared with the case of the related art artificial medium 1, it becomes possible to significantly control the thickness of the artificial medium.

An explanation is now given to a reason why it is possible to cause the receiving plane of the artificial medium that receives the electromagnetic wave 105 to match the conductive plane in the artificial medium 140 of the present invention.

Figure 7:
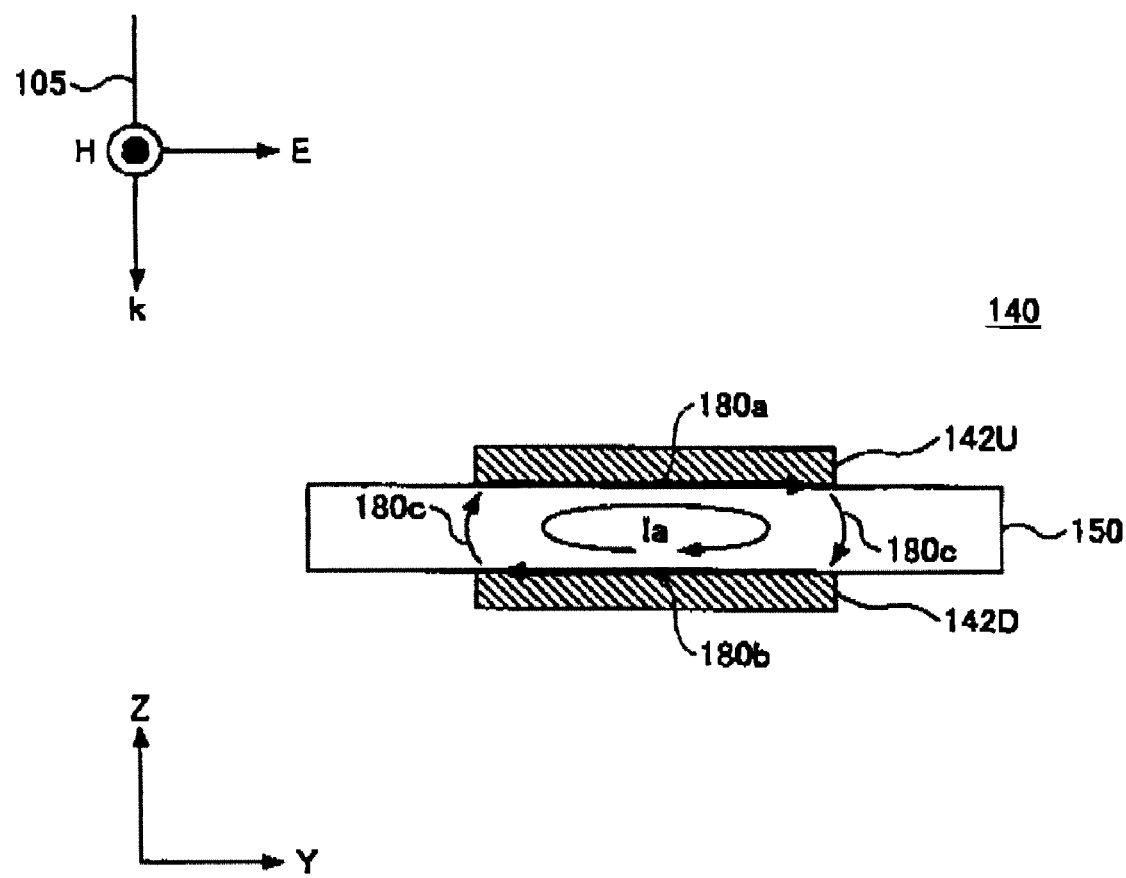
FIG. 7 is an enlarged cross sectional view of the artificial medium shown in FIG. 3, showing directions of electric currents developing in the conductive elements at a high frequency (a resonance frequency).

FIGS. 6 and 7 are enlarged cross sectional views of the artificial medium 140 of the present invention. Directions of electric currents that develop respectively in the conductive elements 142U and 142D are illustrated in the drawings. In particular, FIG. 6 shows directions of electric currents that develop in the conductive elements of the artificial medium at a low frequency band. Further, FIG. 7 shows directions of the electric currents that develop in the conductive elements 142U and 142D of the artificial medium 140 at a high frequency band. Arrows representing the directions of the electric currents shown in both drawings assume importance in terms of orientations, and sizes of the arrows will not represent magnitudes of the electric currents. Although both drawings show that the first and second conductive elements are completely identical with each other in terms of a size, a slight difference of size can exist between the first and second conductive elements. The difference can also become greater according to a usage form of the RFID tag.

When the electromagnetic wave 105 that propagates along a direction from top to bottom (a negative direction of the direction Z) is caused to enter the artificial medium 140 of the present invention, electric currents 180a and 180b shown in FIG. 6 flow into the conductive elements 142U and 142D at a low frequency band. Directions of the electric currents flowing through the respective conductive elements 142U and 142D become equal to each other. Accordingly, in this case, the current loop is not formed, and an increase in effective relative permeability does not arise. In contrast, since a displacement current 180c arises at a high frequency band, electric currents flow through the conductive elements 142U and 142D along directions shown in FIG. 7. A direction of the electric current 180a of the conductive element 142U and a direction of the electric current 180b of the conductive element 142U become exactly opposite to each other. When flows of these electric currents are viewed in a cross section of the dielectric layer 150, a loop current Ia is generated, in a plane (a YZ plane) parallel to the electromagnetic wave 105 of the artificial medium 150, by means of a flow of the electric current 180a of the upper conductive element 142U, a flow of the electric current 180b of the lower conductive element 142D, and a flow of the displacement current 180c that travels so as to transversely cross an interior of the dielectric layer. As a result of occurrence of the loop current Ia in the direction in which the dielectric layers 150 are stacked, a magnetic flux increases, and the effective relative permeability of the artificial medium is considerably increased.

As above, in addition to exhibiting a function of a mere in-phase reflector, the artificial medium 140 of the present invention can cause the conducive plane of the dielectric layer 150 making up the artificial medium 140 to act as a receiving plane. Accordingly, a thickness (T2) of the artificial medium can be made significantly thinner than the related art artificial medium 1, such as that mentioned above. The thickness T2 of the artificial medium 140 can be set to a value of; for instance, 2 mm or less.

(About a Second Characteristic)

As above, the problem (ii); namely, the problem of the inability to prevent occurrence of a great change in input impedance, cannot be solved by means of only an in-phase reflector being formed in the RFID tag by setting the artificial medium in the RFID tag. Accordingly, an additional countermeasure for controlling an input impedance must be taken.

Control of the input impedance of the antenna has hitherto been performed by changing the configuration of the antenna element. However, such a method is fraught with a problem of specifications of the antenna being diversified, which in turn makes it impossible to unify standards. Further, a problem of an increase in manufacturing cost and deterioration of productivity also arises.

In contrast, the present invention is characterized in that "Q control" and "phase control" of the RFID tag 100 are performed by controlling the configuration of the artificial medium 140, thereby optimizing the input impedance. Specifically, the present invention does not need a change in the configuration of the antenna element 120. Therefore, a problem, such as that mentioned above, does not arise.

In the present patent application, the word "Q control" means control of fluctuations in a real part and an imaginary part of the input impedance at an operating frequency band of the RFID tag by controlling a Q factor for resonance of the artificial medium, thereby controlling a matching band. In addition, the word "phase control" means control of the matching band of the RFID tag by changing the resonance frequency of the artificial medium; namely, a phase angle of the input impedance of the RFID tag achieved at the operating frequency of the REID tag.

The "phase control" and "Q control," such as those mentioned above, are hereunder described in more detail by reference to FIG. 8.

Figure 8:
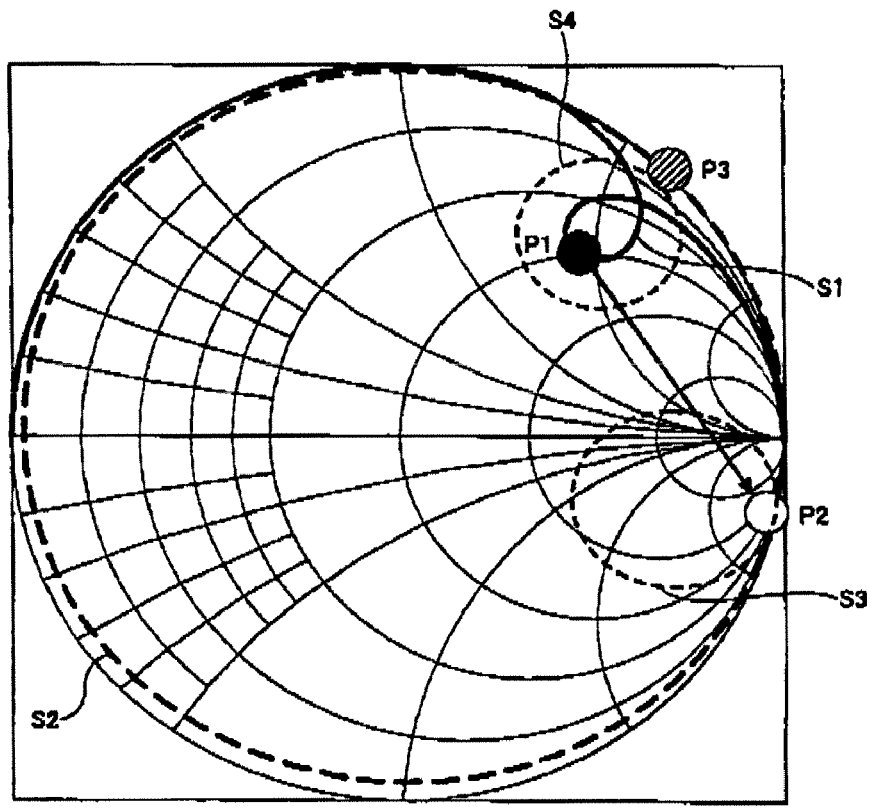
FIG. 8 is a Smith chart for explaining a change in an antenna characteristic.

FIG. 8 is a Smith chart of an S parameter characteristic of the antenna (an impedance chart). Provided that an impedance locus of the antenna element is plotted by a line S1 in the drawing, and an operating point P1 of the antenna element is depicted by means of a solid circle. When such an antenna element is brought close to the metal plate, the impedance changes to a line S2, and the point corresponding to the operating point P1 moves to a point P2. In this case, radiation resistance is too low; hence, the antenna element becomes inoperative.

However, so long as the artificial medium 140 of the present invention is interposed between the antenna element and the metal plate, to thus perform Q control operation, the impedance represented by the line S2 can be changed as designated by a broken line S3. Namely, an impedance locus on the Smith chart; more specifically, a diameter of a circle passing through the point P2, can be changed by Q control. However, despite Q control, the corrected impedance locus (S3) still remains separated from the operating point P1.

Accordingly, "phase control" is next performed. A matching band of the antenna, like an RFID tag, can be changed by performance of phase control. For instance, the operating point P2 can be moved to a point P3.

Therefore, the impedance of the antenna element can be brought closer to the operating point as designated by a line S4 shown in FIG. 8, by performance of "Q control" and "phase control."

According to the present invention, it is possible to extremely easily perform "Q control" and "phase control," such as that mentioned above, by changing a configuration (dimensions) of the artificial medium 140 of the present invention; specifically, dimensions of the first conductive element and those of the second conductive element and a permittivity and a thickness of a dielectric substance that makes up the first insulation layer 125 interposed between the antenna element 120 and the artificial medium 140.

Figure 9:
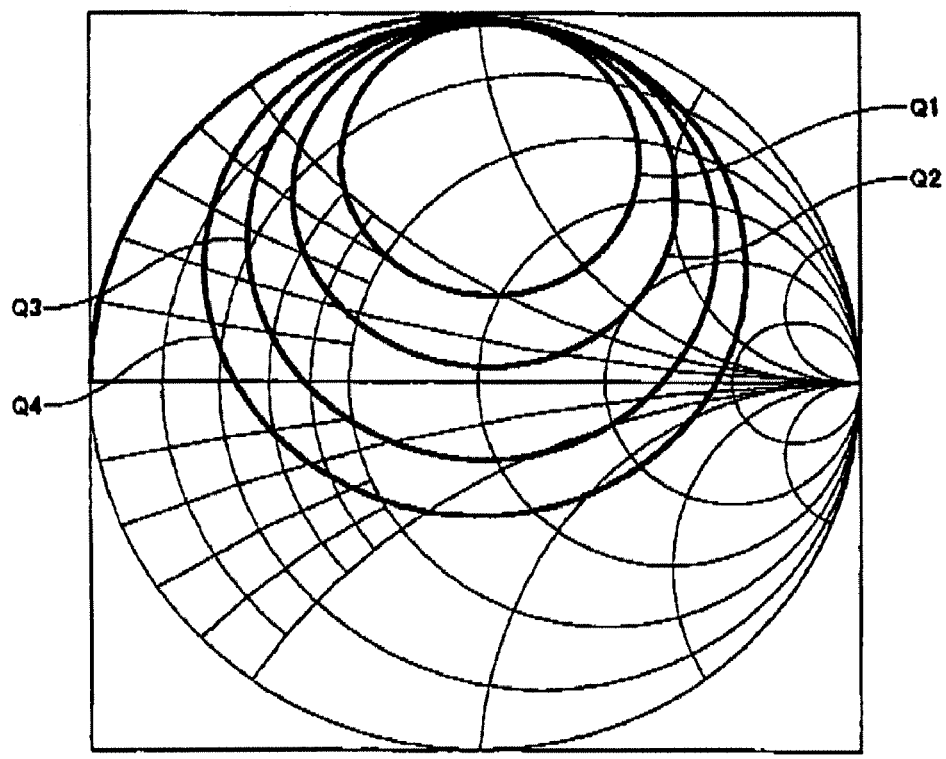
FIG. 9 is a Smith chart showing changes impedance loci of the REID tag of the present invention acquired when a width Wt of conductive elements 142U and 142D of the artificial medium is changed.

FIG. 9 shows a Smith chart of impedance loci acquired when the ratio (Wt/Lt) of a length Lt to a width Wt (see FIG. 1) of each of the conductive elements 142U and 142D of the artificial medium 140 of the present invention is changed. An electromagnetic field simulator Microwave Studio (Product Name) based on a Finite Integrate technique (Finite Integration Technique) was used in analysis. Table 1 shows parameters used when respective waveforms Q1 to Q4 shown in FIG. 9 were obtained.

medium 140 and was placed on the artificial medium 140 by way of the air layer such that extended portions of the antenna pattern 123 were oriented parallel with a lengthwise direction (i.e., a direction of Lt) of the conductive elements 142U and 142D of the artificial medium 140.

The curve Q1 shows a result acquired from the artificial medium having a ratio Wt/Lt of 120%. The curve Q2 shows a result acquired from the artificial medium having a ratio Wt/Lt of 100% (i.e., a square shape); the curve Q3 designates

TABLE 1

| Waveform | Width Wt of conductive element of artificial medium (mm) | Length Lt of conductive element of artificial medium (mm) | Ratio Wt/Lt (%) | Relative permittivity of artificial medium | Relative permeability of artificial medium |
|---|---|---|---|---|---|
| Q1 | 108 | 90 | 120 | 3 | 1 |
| Q2 | 90 | 90 | 100 | 3 | 1 |
| Q3 | 63 | 90 | 75 | 3 | 1 |
| Q4 | 45 | 90 | 50 | 3 | 1 |

Dimensions (Lm, Wm) of the dielectric layer 150 of the artificial medium 140 and the dimensions (Lt, Wt) of the respective conductive elements 142U and 142D were made identical to each other (see FIGS. 1 and 2). Accordingly, the principal front and back surfaces (the conductive planes) of the dielectric layer 150 of the artificial medium 140 were wholly covered with conductive elements. A distance "d1" between the antenna element 120 and the artificial medium 140 was set to 0.8 mm, and the first insulation layer 125 interposed therebetween was embodied as an air layer. The thickness T2 of the artificial medium 140 (see FIG. 3) was set to 2 mm. A distance d2 between the artificial medium 140 and the metal (a mount target) 190 was set to 0.8 mm, and the second insulation layer 170 interposed therebetween was embodied as an air layer. Further, the thickness of all of the conductive elements 142U and 142D of the artificial medium 140 was set to 10 μm.

Figure 10:
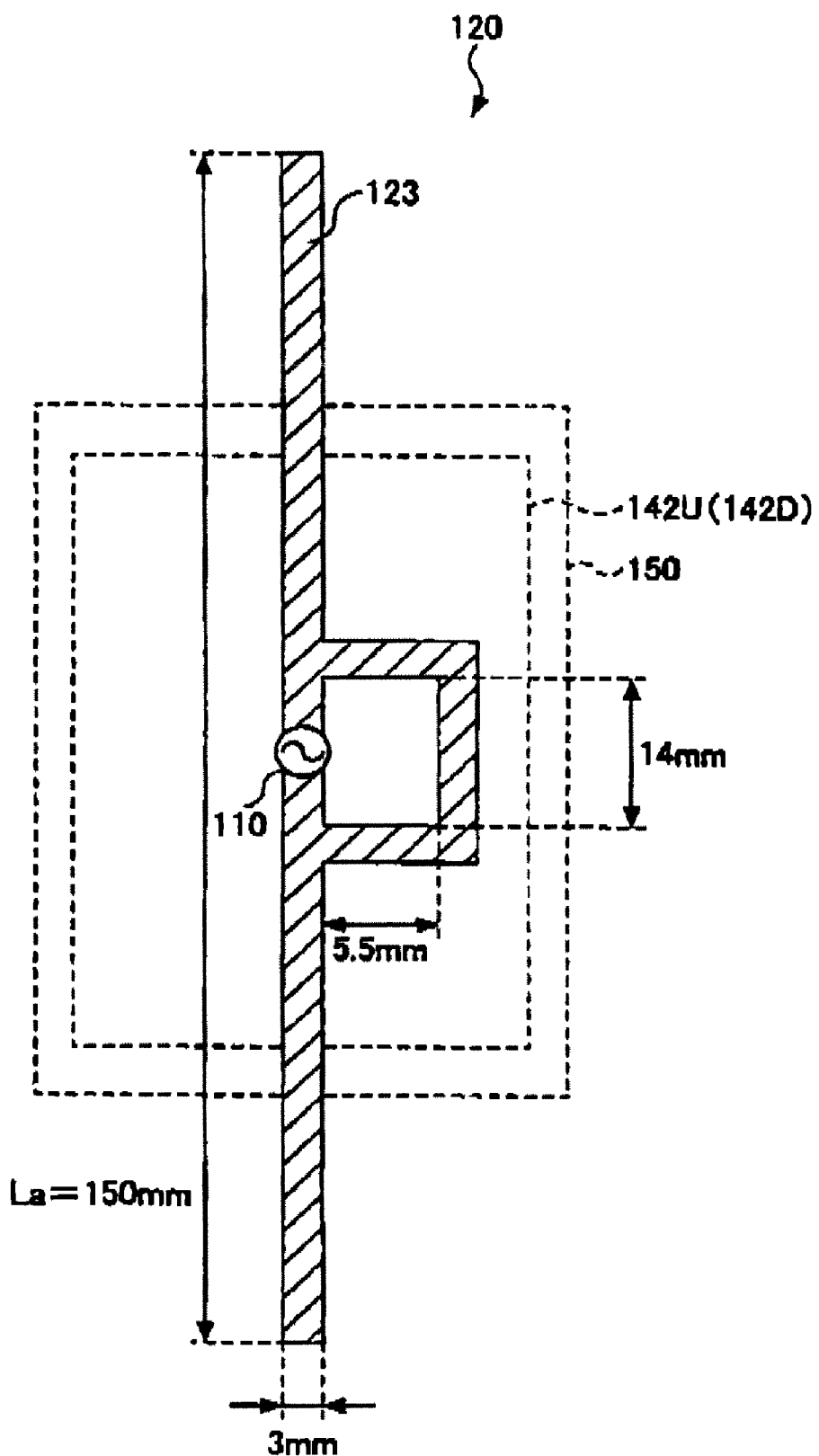
FIG. 10 is a top view showing a geometry of an antenna element used in analysis.

FIG. 10 shows a top view of a geometry of the antenna element 120 used in analysis. In the drawing, the position of the dielectric layer 150 and the position of the first conductive element 142U (or the second conductive element 142D) of the artificial medium 140 both of which are disposed on a lower side of the antenna element 120 are designated by broken lines. As illustrated, the antenna element 120 was built from the antenna pattern 123 and the IC chip (a feed point) 110, and the antenna substrate 122 is omitted. The full length La of the antenna pattern 123 (in other words, the antenna element 120) was set to 150 mm, and the width Wa of the same was set to 11.5 mm. The thickness of the antenna pattern 123 (i.e., the antenna element 120) was set to 10 μm. As shown in FIG. 10, the antenna element 120 includes the IC chip 110 (the feed point) placed at the center of the artificial a result acquired from the artificial medium having a ratio Wt/Lt of 70%; and the curve Q4 designates a result acquired from the artificial medium having a ratio Wt/Lt of 50%.

Figure 11:
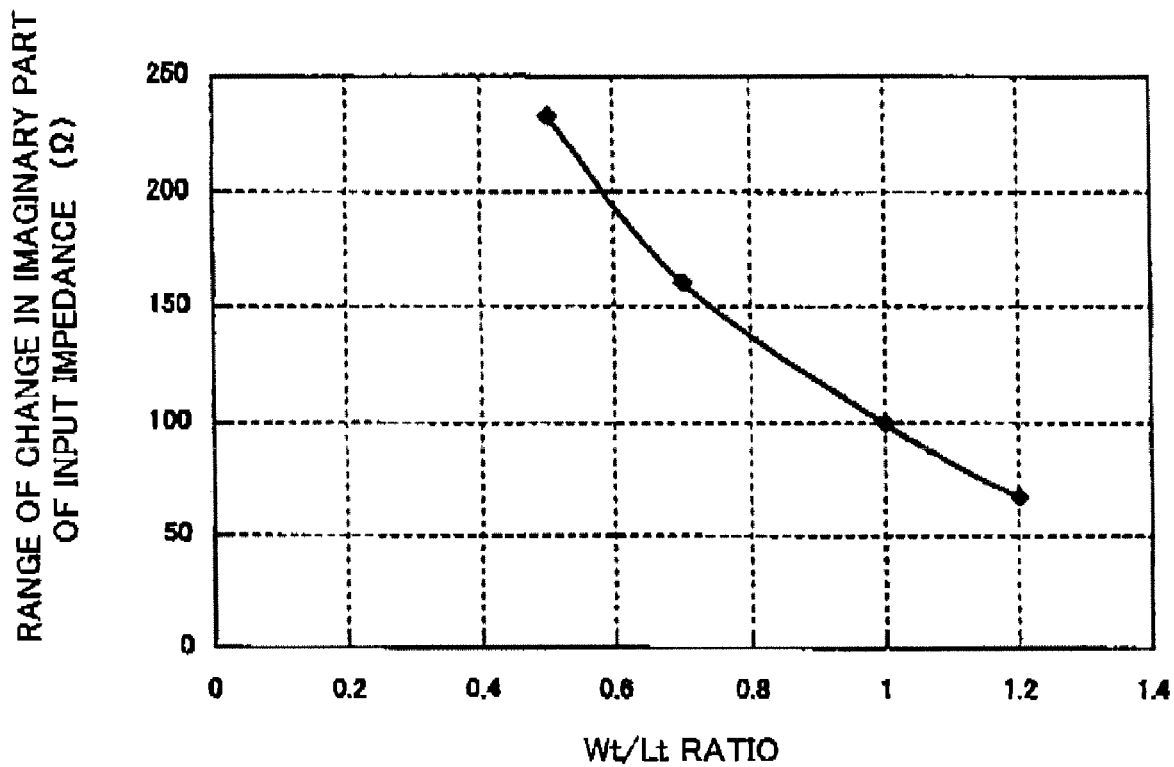
FIG. 11 is a graph showing, in the RFID tag of the present invention, a relationship between a ratio (Wt/Lt) of the width Wt of the conductive elements 142U and 142D of the artificial medium to a length Lt of the elements and a range of change in an imaginary part of an input impedance.

FIG. 11 shows a graph representing a relationship between a range of change in imaginary part of the input impedance (i.e., a diameter of each of the circles) acquired from the Smith chart shown in FIG. 9 and the ratio (Wt/Lt) of the width Wt to the length Lt of each of the conductive elements 142U and 142D of the artificial medium 140. The drawing shows that the range of a change in the imaginary part of the input impedance tends to decrease with an increase in the width Wt of each of the conductive elements 142U and 142D of the artificial medium 140 of the present invention. The drawing shows that the Q factor for resonance of the artificial medium is changed by controlling the width Wt of the conductive elements 142U and 142D of the artificial medium 140. It is seen that control of an input impedance of the antenna consequently becomes possible and that the input impedance of the RFID tag can be set so as to fall within a desired range by combination of Q control with "phase control" to be described later.

Figure 12:
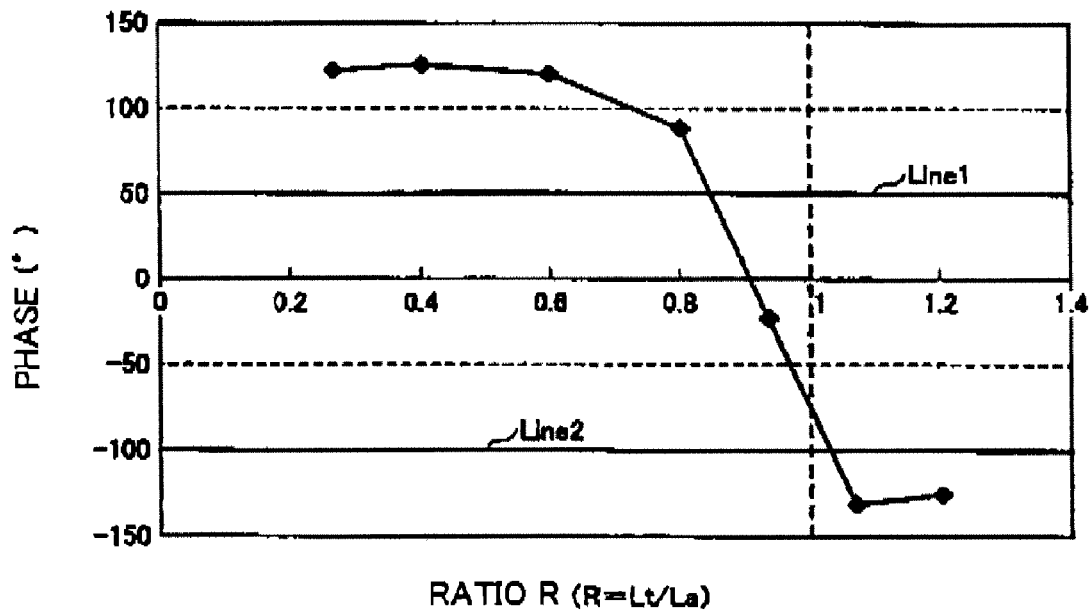
FIG. 12 is a graph showing a phase change with respect to an entire length of a standardized artificial medium in the RFID tag of the present invention.

FIG. 12 shows a relationship between the length Lt of the conductive elements 142U and 142D of the artificial medium 140 of the RFID tag 100 of the present invention and a phase of an S parameter of the antenna element. A horizontal axis represents a value R (R=Lt/La) standardized by dividing the length Lt of the conductive elements 142U and 142D of the artificial medium 140 by the entire length La of the antenna element 120. A vertical axis designates a phase. Results were acquired by means of simulation performed by use of the Microwave Studio (Product Name). Parameters used in simulation are as provided on Table 2.

TABLE 2

| Case | Width Wt of conductive element of artificial medium (mm) | Length Lt of conductive element of artificial medium (mm) | Ratio Lt/La of length Lt of conductive element of artificial medium to length La of antenna element (Lt/La) | Relative permittivity of artificial medium | Relative permeability of artificial medium |
|---|---|---|---|---|---|
| 1 | 20 | 40  | 0.27 | 6.75 | 2.25 |
| 2 | 30 | 60  | 0.40 | 4.50 | 1.50 |
| 3 | 45 | 90  | 0.60 | 3.00 | 1.00 |
| 4 | 60 | 120 | 0.80 | 2.25 | 0.75 |
| 5 | 70 | 140 | 0.93 | 1.93 | 0.64 |
| 6 | 80 | 160 | 1.07 | 1.69 | 0.56 |
| 7 | 90 | 180 | 1.20 | 1.50 | 0.50 |

The antenna element assuming the dimensions and the shape shown in FIG. 10 was used as the antenna element 120. The full length La of the antenna pattern 123 (i.e., antenna element 120) was set to 150 mm, and the width Wa of the same was set to 11.5 mm. The thickness of the antenna pattern 123 (i.e., the antenna element 120) was set to 10 µm. As shown in FIG. 10, the antenna element 120 includes the IC chip 110 (the feed point) placed at the center of the artificial medium 140 and was placed on the artificial layer 140 by way of an air layer in such a way that the extended portions of the antenna pattern 123 become parallel to the lengthwise direction (the direction of Lt) of the respective conductive elements 142U and 142D of the artificial medium 140.

Dimensions (Lm, Wm) of the dielectric layer 150 of the artificial medium 140 and the dimensions (Lt, Wt) of the respective conductive elements 142U and 142D were made identical to each other (see FIGS. 1 and 2) Accordingly, the principal front and back surfaces (the conductive planes) of the dielectric layer 150 of the artificial medium 140 were wholly covered with conductive elements. A distance "d1" between the antenna element 120 and the artificial medium 140 was set to 0.8 mm, and the first insulation layer 125 interposed therebetween was embodied as an air layer. The thickness T2 of the artificial medium 140 was set to 2 mm. The distance d2 between the artificial medium 140 and the metal (a mount target) 190 was set to 0.8 mm, and the second insulation layer 170 interposed therebetween was embodied as an air layer. Further, the thickness of all of the conductive elements 142U and 142D of the artificial medium 140 was set to 10 µm.

In FIG. 12, a straight Line 1 having a phase of about 53° corresponds to a phase of the antenna element 120 in a free space; namely, a target phase. Meanwhile, a straight Line 2 having a phase of about −100° represents a phase acquired when the antenna element 120 is placed in close proximity to the metal plate. The drawing shows that the phase of the input impedance acquired at an operating frequency band of the RFID tag can be readily changed by changing the length Lt of the conductive elements 142U and 142D of the artificial medium 140. The embodiment shows that, when the standardized R falls within a range of 0.80≦R≦0.9; for instance, R=0.85, excellent matching is achieved.

Figure 13:
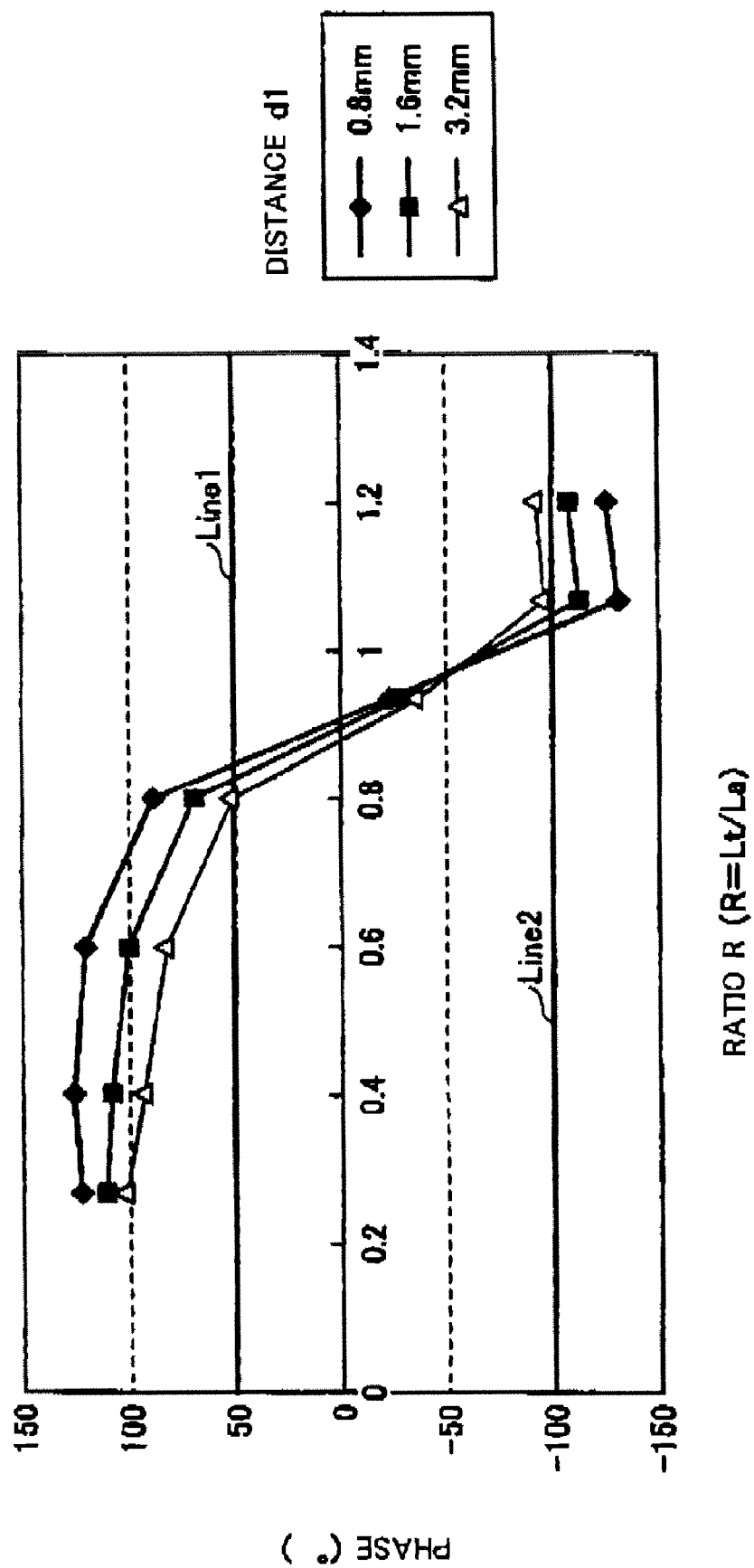
FIG. 13 is a graph showing influence of a distance d1 between the antenna element and the artificial medium on a phase of the RFID tag of the present invention.

FIG. 13 shows a relationship between the length Lt of the conductive elements 142U and 142D of the artificial medium 140 and the phase of the antenna element 120, which is acquired by means of simulation analogous to that shown in FIG. 12 when the distance d1 between the artificial medium 140 and the antenna element 120 is changed. A horizontal axis represents the value R (R=Lt/La) standardized by dividing the length Lt of the conductive elements 142U and 142D of the artificial medium 140 by the full length La of the antenna element 120. The drawing shows that a slope of a straight line having an R value in the neighborhood of 0.85 tends to become gentle with an increase in distance d1. This shows that an appropriate band (a region close to the Line 1) of the RFID tag 100 becomes broader with an increase in distance d1. The RFID tag 100 of the present invention is thus understood to be able to readily control the appropriate band by controlling the distance d1 between the antenna element 120 and the artificial medium 140.

As above, by virtue of the characteristics (1) and (2), the RFID tag of the present invention can make it possible to set the input impedance of the RFID tag within an appropriate range without making a particular change to the configuration of the antenna element and reduce the thickness of the RFID tag.

(Second RFID Tag)

The above descriptions have mentioned the method for achieving impedance matching by means of controlling the configuration of the artificial medium; specifically, the dimensions of the first and second conductive elements and the permittivity and thickness of the dielectric substance making up the first insulation layer 125 interposed between the antenna element 120 and the artificial medium 140, and controlling capacitive coupling developing between the antenna element 120 and the metal plate 190. It is possible to perform "phase control" by means of; for instance, reducing a phase angle of an impedance achieved at an operating frequency band of the antenna by use of the first RFID tag. Likewise, "phase control" can be performed by increasing the phase angle of the impedance achieved at the operating frequency band of the antenna.

Next, an explanation is given to a configuration (a second RFID tag) and a technique of an RFID tag capable of performing "phase control" by increasing relatively, easily the phase angle of the impedance achieved at the operating frequency band of the antenna. The configuration and the technique become considerably effective in a case where a gap between the antenna element 120 and the metal plate 190 shown in FIG. 1 is made narrower and where a dielectric layer having a high permittivity is used for the purpose of miniaturizing the artificial medium 140. A thinned RFID tag can be acquired comparatively easily by means of the configuration of the second RFID tag.

Figure 14:
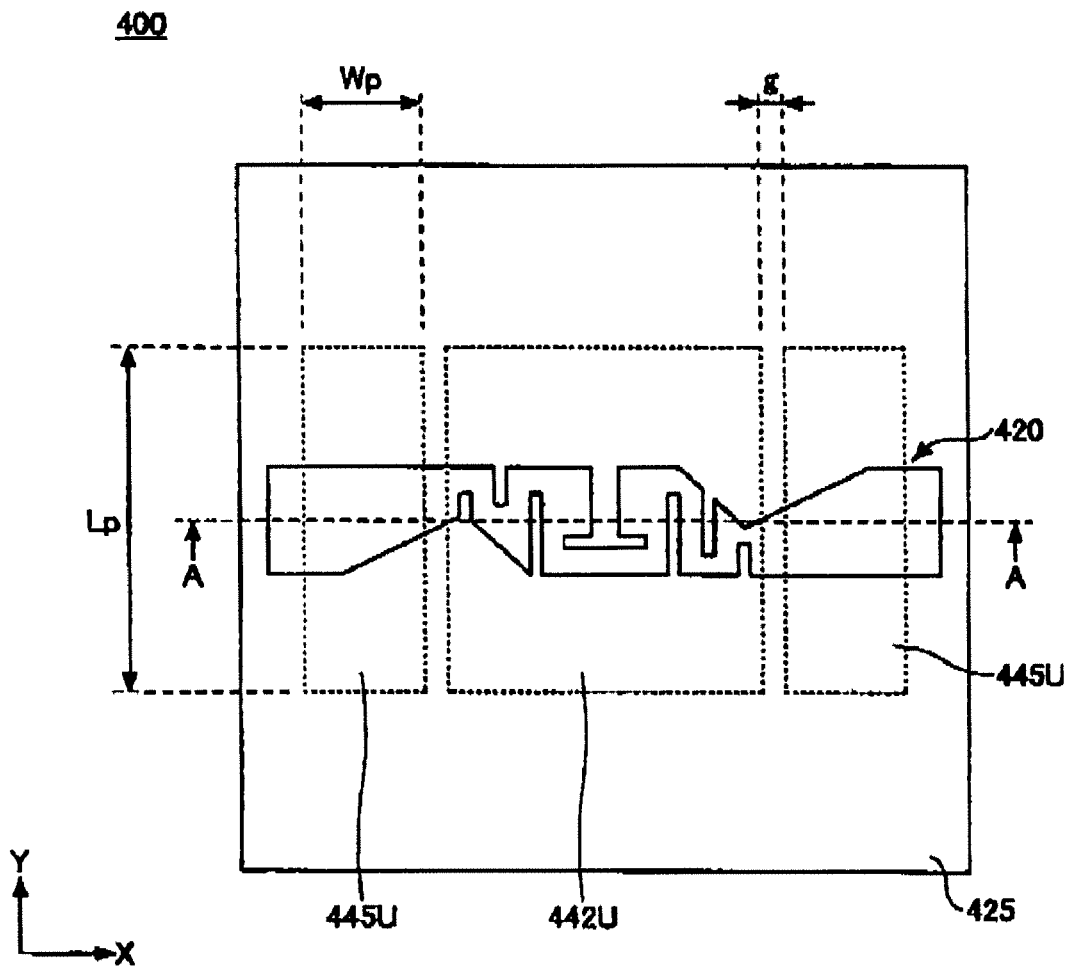
FIG. 14 is a schematic top view of a second RFID tag of the present invention.
Figure 15:
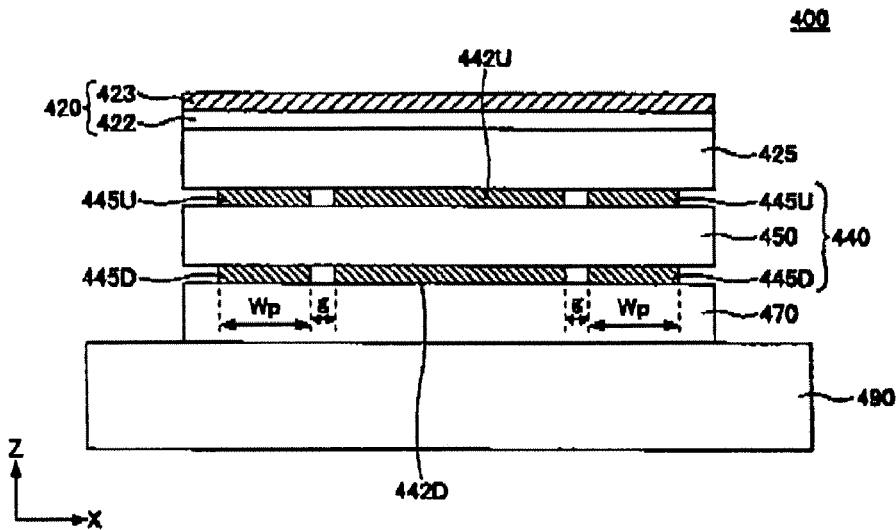
FIG. 15 is a view schematically showing a cross section of the second RFID tag taken along line A-A shown in FIG. 14.

The configuration of the second RFID tag of the present invention is first described. FIG. 14 schematically shows a top view of the second RFID tag 400 of the present invention. FIG. 15 schematically shows a cross section taken along line A-A shown in FIG. 14. An antenna pattern described in connection with JP 4026080 is used as the antenna pattern shown in FIG. 14. An antenna pattern 423 used in the second RFID tag 400 is not limited to the foregoing antenna pattern and may also be any pattern.

The second RFID tag 400 is basically configured in the same manner as is the RFID tag 100 shown in FIGS. 1 and 2. Accordingly, the members of the second RFID tag 400 that are analogous to their counterparts of the RFID tag 100 are assigned reference numerals that are determined by addition of 300 to their original reference numerals. In relation to the second RFID tag 400, attention must be paid to that the relative permittivity of a first insulation layer 425 is greater than the relative permittivity of its counterpart first insulation layer of the first RFID tag 100 (e.g., a value of five or more). The second RFID tag 400 is greatly different from the RFID tag 100 in that a conductive parasitic element is mounted on either surface of a dielectric layer 450 of an artificial medium 440.

The parasitic element has first parasitic elements 445U and second parasitic elements 445D. The first parasitic elements 445U are formed so as to be level with a surface of the dielectric layer 450 where a first conductive element 442U is formed. The second parasitic elements 445D are formed so as to be level with the surface of the dielectric layer 450 where a second conductive element 442D is formed. When a cross section of the second RFID tag 400 is viewed in a direction (i.e., the direction Y) perpendicular to an extending direction of an antenna element 420 (the direction X in FIGS. 14 and 15), the first parasitic elements 445U are disposed one on each side of the first conductive element 442U, and the second parasitic elements 445D are disposed one on each side of the second conductive element 442D. Each of the parasitic elements 945U and 445D assumes a width Wp (a length in the direction X) and the full length Lp (a length in the direction Y). A gap having a width "g" is formed between the first parasitic element 445U and the first conductive element 442U, and a gap having a width "g" is formed between the second parasitic element 445D and the second conductive element 442D.

No particular limitations are imposed on the shape of the first and second parasitic elements 445U and 445D, and both parasitic elements may also assume a square shape or a rectangle shape. In the embodiment shown in FIG. 15, both the parasitic elements 445U and 445D assume the same shape. When viewed along a direction parallel to a thicknesswise direction of the artificial medium 440, the parasitic elements 445U and 445D are placed one on each surface of the dielectric layer 450 so as to be positionally aligned to each other. However, a correlation between the parasitic elements 445U and 445D is not limited to such a state. Specifically, the parasitic elements 445U and 445D may differ from each other in terms of a dimension and/or a shape. When viewed in a direction parallel to a thicknesswise direction of the artificial medium 440, positions of the parasitic elements 445U and 445D may differ from each other.

More specifically, a positional deviation of about ±10% and an angular deviation of about ±5° may exist between the antenna element 420 and the artificial medium 440. Moreover, a dimensional deviation of about ±5% may also exist between the first and second conductive elements 442U and 442D and the first and second parasitic elements 445U and 445D that all make up the artificial medium 440. Further a relative positional deviation of about ±5% may also exist between the first and second conducive elements 442U and 442D and the first and second parasitic elements 445U and 445D.

A characteristic of the second RFID tag 400 having such a configuration is now described.

When the gap between the antenna element 120 and the metal plate 190 in the RFID tag 100, such as that shown in FIG. 1, is made narrower for further thinning purpose, capacitive coupling between the antenna element and the metal plate increases, and input impedance of the antenna greatly deviates from a target input impedance.

Moreover, in order to miniaturize the artificial medium 140, increasing the relative permittivity ∈r of the dielectric layer 150 of the artificial medium 140 (to a value of; for instance, five or more) is effective.

However, capacitive coupling increases with an increase in the relative permittivity ∈r of the dielectric layer 150 of the artificial medium 140. For this reason, when the relative permittivity is increased for further miniaturization purpose, the input impedance of the antenna greatly deviates from the target input impedance.

Figure 16:
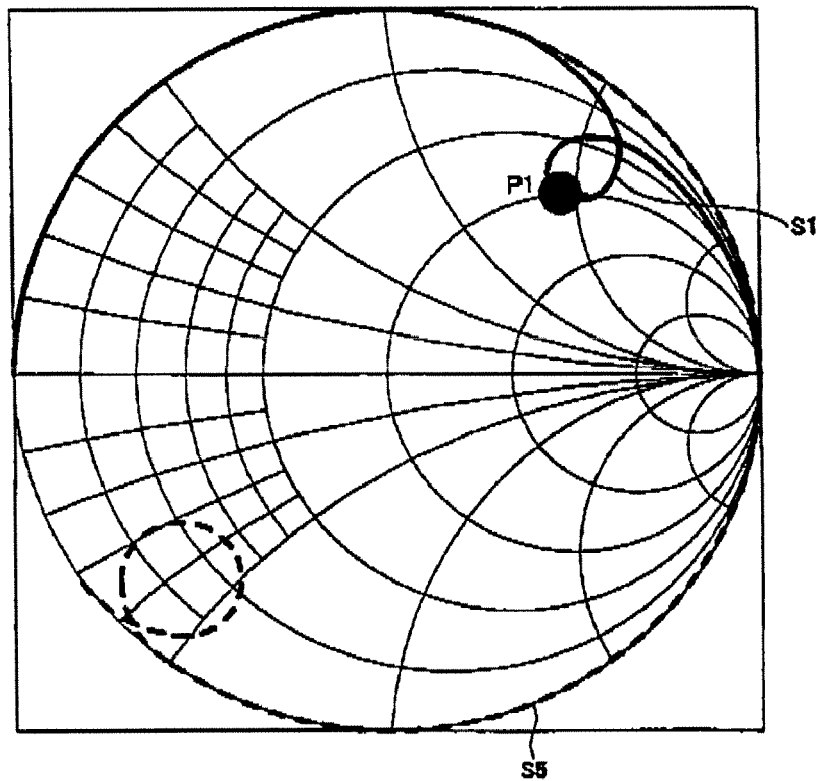
FIG. 16 is a Smith chart for describing an antenna characteristic of the RFID tag of the present invention achieved when a high dielectric member is used for a first insulation layer and a dielectric layer.

FIG. 16 is a plot of an S parameter characteristic of the antenna achieved at this time in the form of a Smith chart. In the drawing, a curve S1 designated by a solid line denotes a locus of an input impedance of the antenna element, and a point P1 denotes an operating point of the antenna element. In the RFID tag 100, when the gap between the antenna element 120 and the metal plate 190 is made narrow or when the relative permittivity ∈r of the dielectric layer 150 of the artificial medium 140 is increased, capacitive coupling developing between the antenna element and the metal plate increases. Therefore, the impedance of the antenna changes like; for instance, a curve S5 of the drawing, thereupon greatly deviating from the operating point P1 of the antenna element. The deviation is also clear from a comparison between a curve S2 shown in FIG. 8 and a curve S5 shown in FIG. 16. Therefore, in this case, operation of impedance control effected by "Q control" and "phase control" becomes more complicate.

On the contrary, when the second RFID tag 400 is viewed in the direction Y shown in FIG. 14, the parasitic elements 445U (445D) are disposed one on each side of the first (second) conductive elements 442U (442D). In such a configuration, the conductive parasitic elements 445U (445D) are disposed one on each side of the antenna element 420 along a lengthwise direction of the antenna element 420 on which an electric field concentrates. Therefore, capacitive coupling between the antenna element 420 and a metal plate 490 becomes greater. Further, capacitive coupling can also be increased by using for the first insulation layer 425 a dielectric substance having a high permittivity.

Figure 17:
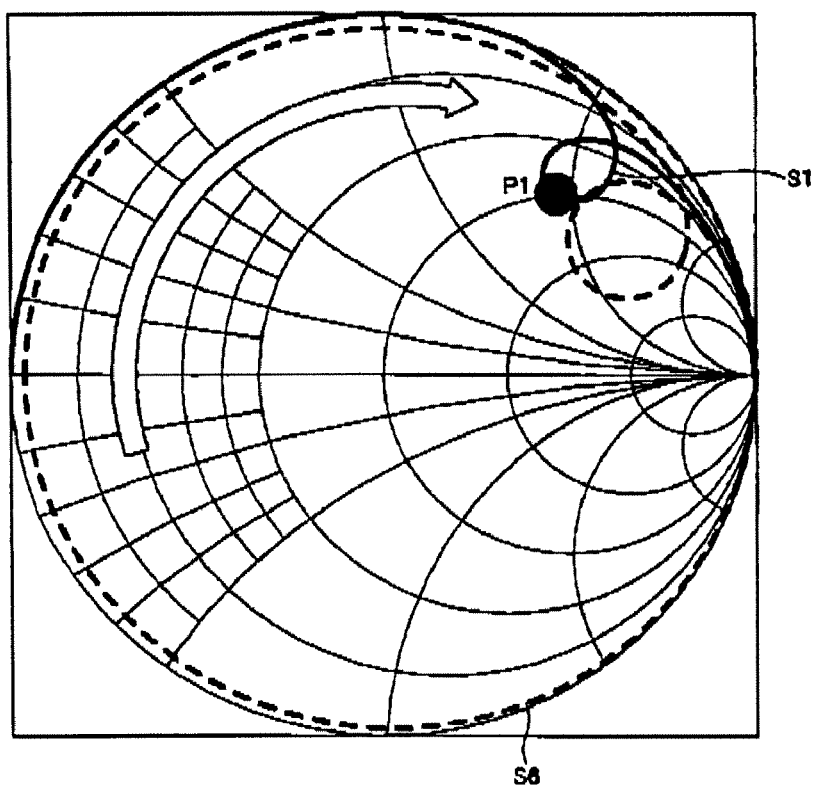
FIG. 17 is a Smith chart for describing an antenna characteristic of the second RFID tag of the present invention.

FIG. 17 is a view for explaining a state achieved at this time by means of the Smith chart. In a configuration, such as that of the second RFID tag 400, a dielectric substance having a higher permittivity is used as the first insulation layer 425. Further, capacitive coupling is increased by presence of the parasitic elements 445U and 445D. Therefore, the impedance of the antenna element shifts from the curve S5 shown in FIG. 16 (not shown in FIG. 17) in a direction of an arrow, thereby changing like; for instance, a curve S6. In this case, a deviation of an acquired impedance locus from the target operating point P1 becomes significantly smaller, whereby input impedance matching becomes easier to perform.

Therefore, even when the relative permittivity ∈r of the dielectric layer 450 of the artificial medium 440 becomes greater (e.g., a value of five or more); namely, when an RFID tag is extremely thin and assumes a thickness in the neighborhood of 1 mm, such a configuration provides a characteristic of input impedance control effected by means of "Q control" and "phase control" being facilitated, thereby much broadening a degree of design freedom.

An advantage yielded at this time is hereunder described more specifically.

Figure 18:
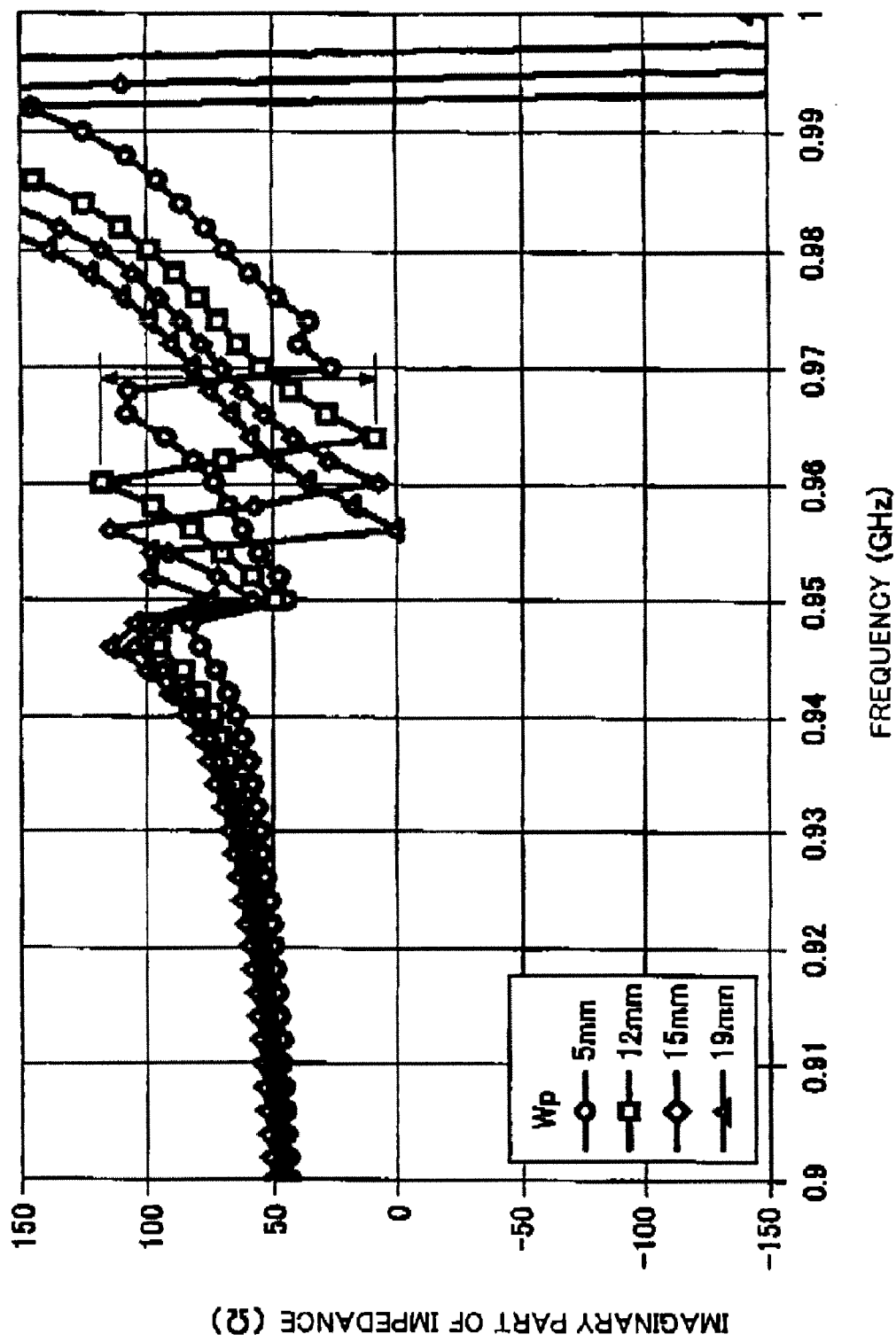

FIG. 18 shows a result of analysis of the influence of the width Wp of the parasitic elements on the imaginary part of the impedance of the second RFID tag 400 achieved through a simulation. The electromagnetic field simulator Microwave Studio (Product Name) based on the Finite Integrate technique was used for simulation.

The second RFID tag 400 used in simulation has the following configurations.

The conductive antenna pattern 423 of the antenna element 420 has a length La of 94 mm and a width Wa of 16 mm;

the conductive antenna pattern 423 has a thickness of 10 μm, and an antenna substrate 422 has a thickness of 0.038 mm;

the first insulation layer 425 has a thickness of 0.635 mm and a relative permittivity Er of 9.6;

the dielectric layer 450 of the artificial medium 440 has a thickness of 0.254 mm and a relative permittivity ∈r of 9.6;

the first conductive element 442U and the second conductive element 442D of the artificial medium 440 have a length Lt of 45 mm in the direction X, a length Wt of 50 mm in the direction Y, and a thickness of 10 μm;

the first parasitic elements 445U and the second parasitic elements 445D have a length Lp of 50 mm, and a thickness of 10 μm and a gap having a width "g" of 7.5 min exists between the conductive element 442U (442D) and the parasitic elements 445U (445D); and a second insulation layer 470 has a thickness of 0.15 mm and a relative permittivity ∈r of 3.3.

A width Wp of each of the parasitic element assumes a value of 5 mm, a value of 12 mm, a value of 15 mm, and a value of 19 mm.

It is seen from FIG. 18 that resonance appears in two frequency bands at any width Wp. Resonance (first resonance) appearing on a low frequency side (a frequency of about 940 MHz to 959 MHz) is ascribable to contribution of the first and second conductive elements of the artificial medium. Resonance (second resonance) appearing on a high frequency side (a frequency of about 950 MHz to 970 MHz) is ascribable to resonance of the parasitic elements.

Figure 19:
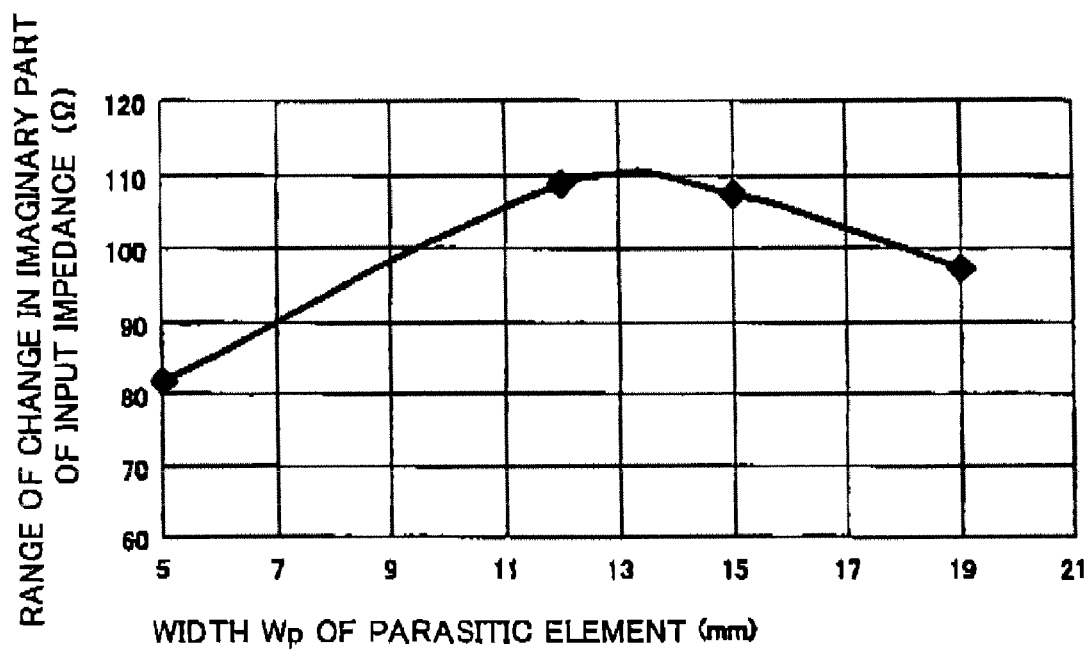
FIG. 19 is a graph showing influence of the width Wp of the parasitic element on the range of change in the imaginary part of the input impedance.

FIG. 19 is a graph showing that a range of change in the imaginary part of the input impedance occurred at the frequency band in FIG. 18 where the second resonance appeared (an example range is denoted by an arrow in FIG. 1a) is plotted against the width Wp of the parasitic element. It is seen from the drawing that the range of change in the imaginary part of the input impedance; namely, the Q factor, can be greatly changed by controlling the width Wp of the parasitic element.

Figure 20:
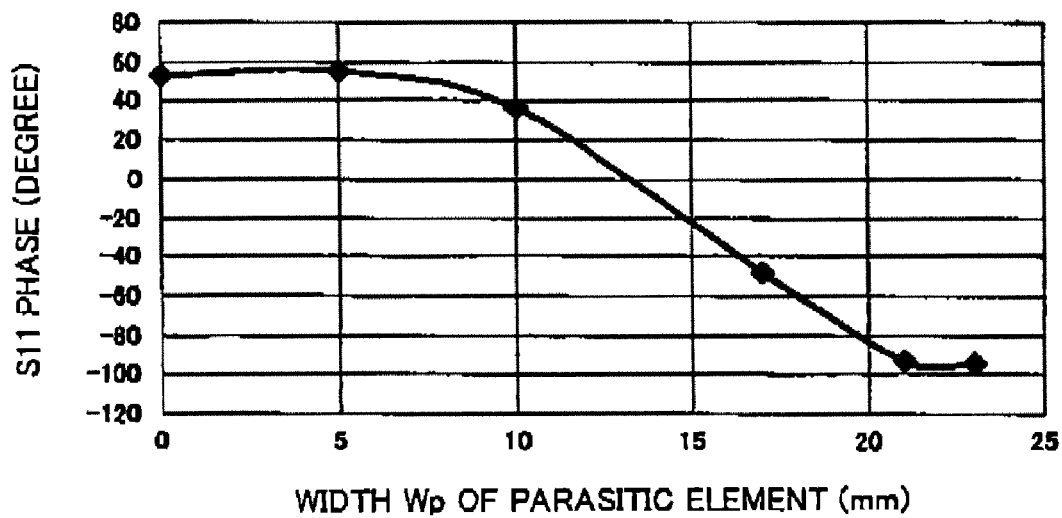
FIG. 20 is a graph showing influence of the width Wp of the parasitic element on a phase of an S11 at a frequency of 952 MHz.

FIG. 20 shows a result of analysis of the influence of the width Wp of the parasitic elements on a phase change in the second RFID tag 400 achieved by means of the simulation technique.

The second RFID tag 400 used in simulation has the following configuration.

The conductive antenna pattern 423 of the antenna element 420 has a length La of 94 mm and a width Wa of 16 mm;

the conductive antenna pattern 423 has a thickness of 10 μm, and the antenna substrate 422 has a thickness of 0.038 mm;

the first insulation layer 425 has a thickness of 0.462 mm and a relative permittivity ∈r of 10;

the dielectric layer 450 of the artificial medium 440 has a thickness of 0.2 mm and a relative permittivity ∈r of 10;

the first conductive element 442U and the second conductive element 442D of the artificial medium 440 have a length Lt of 45 mm in the direction X, a length Wt of 50 mm in the direction Y, and a thickness of 10 μm;

the first parasitic elements 445U and the second parasitic elements 445D have a length Lp of 50 mm, and a thickness of 10 μm, and a gap having a width "g" of 3.5 mm exists between the conductive element 442U (442D) and the parasitic elements 445U (445D); and the second insulation layer 470 has a thickness of 0.5 mm and a relative permittivity ∈r of 3.16.

As shown in FIG. 20, the phase of an S parameter (S11) acquired at a frequency of 952 MHz greatly changes with a change in the width Wp of the parasitic elements. It can be seen from the change that the foregoing "phase control" can be performed more easily by placing the parasitic elements 445U and 495D.

As mentioned above, the phase S11 of the RFID tag and the range of change in the imaginary part of the input impedance are greatly changed by the width Wp of the parasitic element. Accordingly, it becomes possible to perform "Q control" and "phase control" more easily by placing the parasitic elements and controlling the width Wp thereof.

Figure 21:
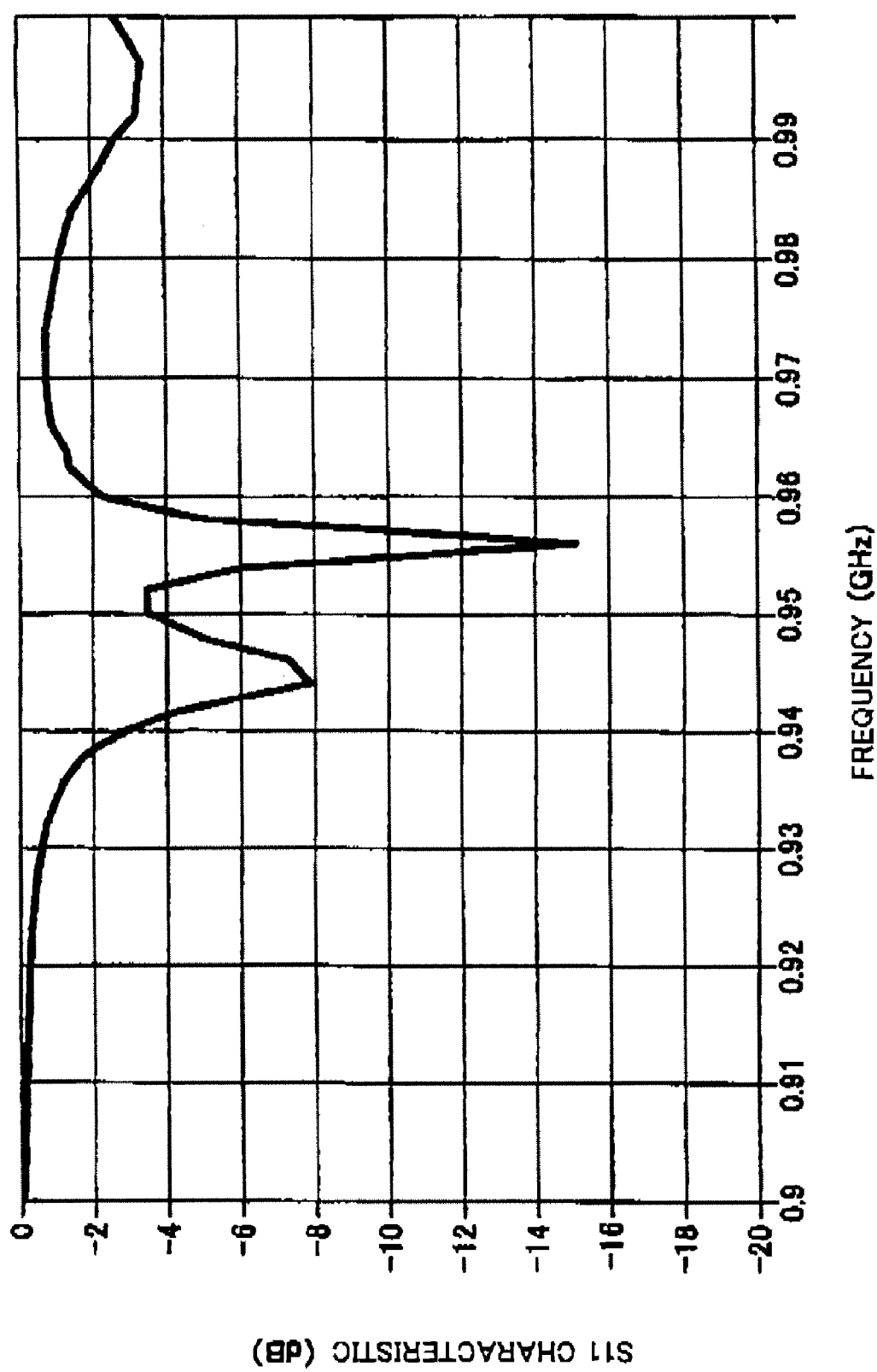
FIG. 21 is an example result of analysis of a characteristic of the second RFID tag of the present invention.

FIG. 21 shows a result of analysis of the characteristic of the second RFID tag 400 performed through foregoing simulation. A result of return loss is normalized by means of a complex conjugate of the input impedance of the IC.

The second RFID tag 400 used in simulation has the following configurations.

The conductive antenna pattern 423 of the antenna element 420 has a length La of 94 mm and a width Wa of 16 mm;

the conductive antenna pattern 423 has a thickness of 10 μm, and the antenna substrate 422 has a thickness of 0.038 mm;

the first insulation layer 425 has a thickness of 0.635 mm and a relative permittivity ∈r of 9.6;

the dielectric layer 450 of the artificial medium 440 has a thickness of 0.254 mm and a relative permittivity ∈r of 9.6;

the first conductive element 442U and the second conductive element 442D of the artificial medium 440 have a length Lt of 35 mm in the direction X, a length Wt of 50 mm in the direction Y, and a thickness of 10 μm;

the first parasitic elements 445U and the second parasitic elements 445D have a width Wp of 15 mm, a length Lp of 50 mm, and a thickness of 10 μm, and a gap having a width "g" of 7.5 mm exists between the conductive element 442U (442D) and the parasitic elements 445U (445D); and the second insulation layer 470 has a thickness of 0.15 mm and a relative permittivity ∈r of 3.3.

It is seen from FIG. 21 that excellent matching is effected in the neighborhood of a frequency of 952 MHz by adoption of the foregoing parameters. The RFID tag is understood to operate at multiple bands by means of the parasitic elements 445U and 445D. In FIG. 21, a high frequency band width of the matching frequency band can be controlled by changing the width of the parasitic elements 445U and 445D and performing "Q control."

To this end, there are cases where a dielectric layer and the first insulation layer that have a relative permittivity of five or five or more are used in order to make the RFID tag much thinner. In this case, capacitive coupling developing between the antenna element and the metal plate may greatly increase, thereby making impedance matching difficult.

However, in the case of the configuration of the second RFID tag 400, "Q control" and "phase control" become more facilitated, and it is possible to readily design an RFID tag whose input impedance is set so as to fall within an appropriate range.

(Method for Manufacturing an RFID Tag of the Present Invention)

Figure 22:
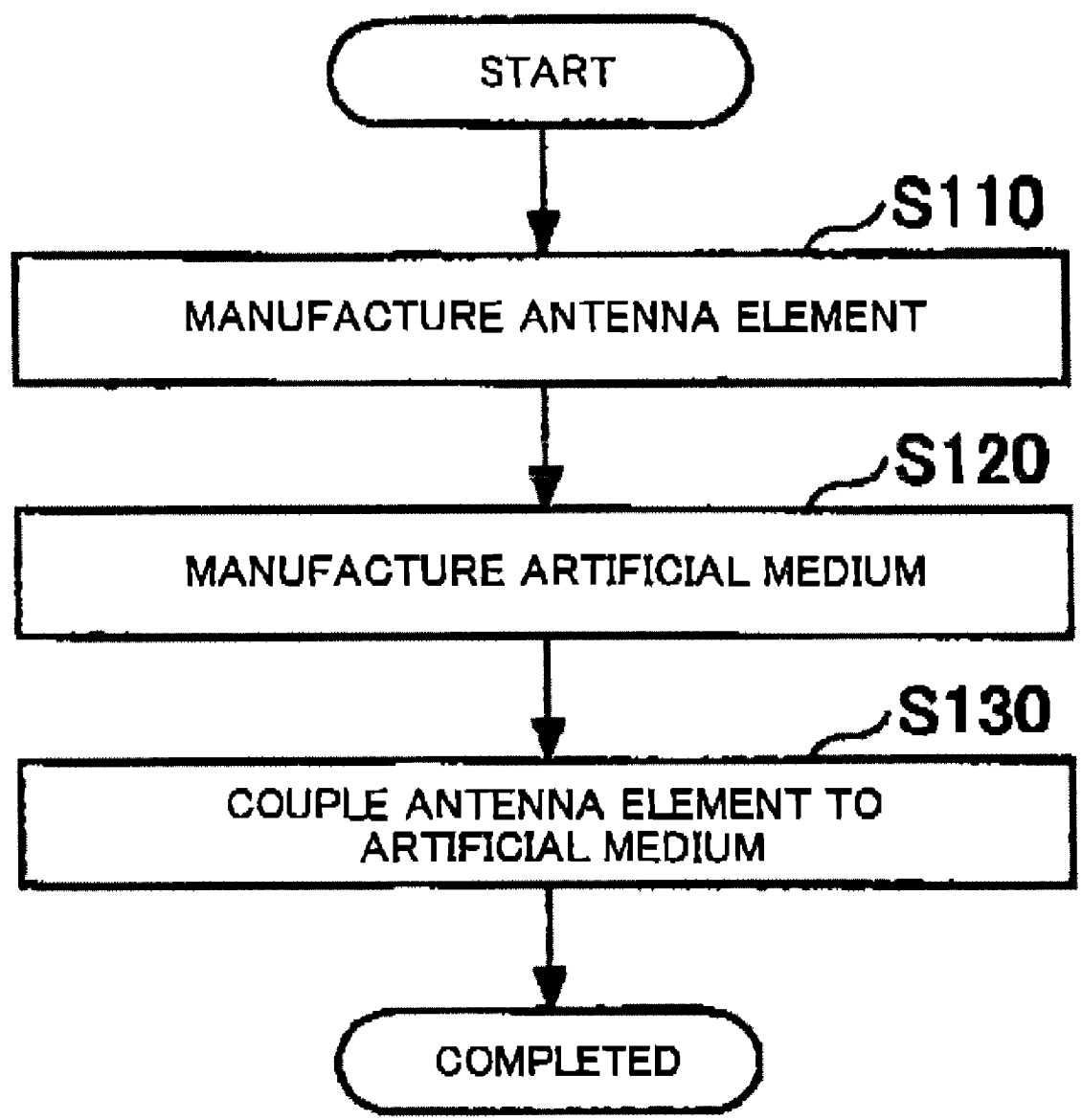
FIG. 22 is a flowchart showing an example method for manufacturing the RFID tag of the present invention.

An example method for manufacturing the RFID tag 100 of the present invention is now described by reference to FIG. 22. FIG. 22 is a view showing a flow of manufacture of the RFID tag 100 of the present invention. A method to be described below is a mere illustration. It is obvious for the persons skilled in the art that the RFID tag 100 of the present invention can also be manufactured by means of another technique.

As shown in FIG. 22, the RFID tag 100 of the present invention is manufactured by means of a step (step S110) of fabricating the antenna element 120 having the IC chip 110, a step (step S120) for forming the artificial medium 140, and a step (step S130) for coupling the antenna element 120 to the artificial medium 140. Each of the steps is hereunder described in detail.

(Step S110: Fabrication of the Antenna Element)

First, the antenna element 120 having the IC chip 110 and the antenna patterns 123 is prepared on the antenna substrate 122, such as that shown in FIG. 1. For instance, a PET (polyethylene terephthalate) film, is used for the antenna substrate 122. The antenna patterns 123 are placed on the antenna substrate by means of pattering; for instance, copper.

(Step S120: Formation of an Artificial Medium)

The artificial medium 140 of the present invention is next formed by the following technique.

The dielectric layer of the present invention is described in detail before explanation of the technique for forming the artificial medium 140. The dielectric layer 150 of the artificial medium 140 is formed from; for instance, a thermoplastic resin and a filler.

A related art, commercially available dielectric layer exhibiting a high relative permittivity and a low loss uses polyphenylene sulfide (PPS) as a thermoplastic resin, as well as using barium titanate ($BaTiO_3$) as a filler. However, in connection with a low loss of the related art dielectric layer, a dielectric loss tangent assumes a value of 0.002 or less, and the dielectric layer assumes a relative permittivity of 10.8 at most and does not fulfill a relative permittivity of 11. In order to comply with a compact, thin RFID tag, it is desirable that a dielectric layer used as an RFID tag will assume a low loss value of 0.001 or less and a relative permittivity value of 13 or more. A higher relative permittivity is more desirable, so long as a loss can be kept low.

Therefore, the inventors of the present invention successfully developed a resin sheet, by means of making assiduous efforts, that exhibits a low loss value of 0.001 or less and a relative permittivity value of 13 or more.

For instance, syndiotactic polystyrene (SPS) (a specific gravity of 1.04) is used for the thermoplastic resin. Further, for instance, strontium titanate ($SrTiO_3$) particles or mixed particles consisting of strontium titanate ($SrTiO_3$) and barium titanate ($BaTiO_3$) are used for fillers. The mixed particles assume a composition ratio; for instance, 3:7 ($SrTiO_3$: $BaTiO_3$). No particular limitations are imposed on an average particle size of the filler particles; however, an average particle size assumes a value of; for instance, 0.1 to 10 μm (e.g., 0.6 μm).

In order to remove moisture, the thermoplastic resin and the filler particles can also be subjected to desiccation treatment before use. Desiccation treatment is performed by keeping the thermoplastic resin and/or the filler particles in a temperature range of; for instance, 60 to 100° C. (e.g., 80° C.), for one hour to two days (e.g., 24 hours). The thermoplastic resin and the filler particles can also assume identical or different requirements for desiccation treatment.

Subsequently, a kneading machine (or a mixer) kneads the thermoplastic resin with the filler particles according to the following technique.

A thermoplastic resin is first fed to the kneading machine. No specific limitations are imposed on the number of revolutions of the kneading machine. The number of revolutions of the kneading machine is; for instance, 100 rpm or thereabouts. The kneading machine is previously kept at a predetermined temperature (e.g., 300° C.). After elapse of several minutes, the thus-fed thermoplastic resin is fully fused.

Next, the filler particles are fed to the kneading machine, where the particles are kneaded. A quantity of filler particles fed can also be controlled in such a way that a fraction by weight comes to 50% to 95% (e.g., 85%) or that a volume fraction comes to 10% to 60% (e.g., 54%). Further, the filter particles can also be separately fed at several times.

Next, after having cooled to a room temperature, a mixture is subjected to pressure molding (see, 200 MPa) by use of a pressing machine held at a high temperature, whereby a sheet of dielectric layer including filler particles uniformly dispersed in a matrix of thermoplastic resin can be produced. The temperature of the pressing machine is; for instance, about 300° C.

Such a sheet of dielectric layer has; for instance, a relative permittivity ∈r of 2 to 50 and a dielectric loss (tan δ) of about 0.0001 to 0.1. For instance, when a sheet of dielectric layer is produced from an SPS matrix including a 85% strontium titanate ($SrTiO_3$) particles fraction by weight as a filter material, a relative permittivity of the sheet of dielectric layer is about 16, and a dielectric loss (tan δ) of the same is about 0.003. Although no specific limitations are imposed on the thickness of the sheet of dielectric layer, the thickness of the sheet of dielectric layer can be significantly reduced in the present invention. The thickness of the sheet of dielectric layer can be set to fall in a range of; for instance, 0.1 mm to 2 mm and, more specifically, 0.2 mm.

Next, the thus-produced sheet of dielectric layer is cut into desired dimensions, whereby the dielectric layer 150 shown in FIG. 2 is produced. Although the flexible dielectric layer 150 can be produced under the foregoing manufacturing method, the dielectric layer 150 does not always need flexibility. The dielectric layer 150 can also be produced by means of another method.

The first conductive element 142U and the second conductive element 142D are placed one on each of the principal surfaces of the thus-produced dielectric layer 150. These conductive elements can also be formed from; for instance, copper, and assume a thickness from about 5 μm to 50 μm (e.g., 20 μm). Moreover, the conductive elements are formed so as to assume the same dimensions of the dielectric layer in height and width or smaller. The conductive elements are placed one on each of the principal surfaces of the dielectric layer in such a way that the conductive layers are aligned to each other when viewed in a direction parallel to the thickness direction of the dielectric layer.

The important points here are the following. Specifically, fluctuations in the real part and the imaginary part of the input impedance appearing at the operating frequency band of the finally-obtained RFID tag 100 are controlled so as to fall within a "desired range" by controlling the length Lt and the width Wt of the dielectric layer 150 of the artificial medium. Further, the phase angle of the input impedance of the finally-obtained RFID tag 100 is controlled so as to fall within a "desired range" by controlling the ratio of the length Lt of the dielectric layer 150 to the entire length La of the antenna element 120 (Lt/La).

The "desired range" of the fluctuations in the real part and the imaginary part of the input impedance appearing at the operating frequency band of the RFID tag 100 and the "desired range" of the phase angle are determined by the operating point of one antenna element 120 and, therefore, obvious beforehand. Specifically, the "desired range" of the fluctuations in the real part and the imaginary part of the input impedance appearing at the operating frequency band of the RFID tag 100 and the "desired range" of the phase angle are determined in such away that fluctuations in the real part and the imaginary part of the input impedance appearing at the operating frequency band of the RFID tag 100 and a phase angle become equivalent to an operating point of one antenna element 120.

Fluctuations in the real part and the imaginary part of the input impedance appearing at the operating frequency band of the RFID tag 100 and a phase angle can easily be controlled to an operating point of the antenna element by means of such a simple dimensional design of the artificial medium.

The artificial medium 140 having the foregoing characteristics can be produced through the foregoing processes.

(Step S130: Bonding the Antenna Element to the Artificial Medium)

The antenna element and the artificial medium, which have been manufactured in the manner as mentioned above, are bonded together as follows.

The insulation layer 125 is placed on an exterior side of the first conductive element 142U of the artificial medium 140 manufactured under the foregoing method. The insulation layer 125 is formed from; for instance, a commercially available thermoplastic resin sheet having a low permittivity. The insulation layer 125 has a thickness of; for instance, 0.005 mm to 0.5 mm (e.g., 0.35 mm). In normal times, the insulation layer 125 assumes the same dimensions in height and width as those of the dielectric layer 140.

As shown in FIG. 13, the input impedance of the RFID tag 100 can be made closer to the operating point of the antenna element much easily by controlling the thickness of the insulation layer 125; specifically, the distance d1 to an appropriate value.

The dielectric layer 140 and the antenna element 120 are bonded together by way of the first insulation layer 125, whereby the RFID tag of the present invention is formed. No specific limitations are imposed on a method for bonding the dielectric layer and the antenna element. They can be bonded together by means of various methods; for instance, a pressure method, a thermocompression bonding method, a bonding using an adhesive, and the like.

Subsequently, the second insulation layer 170 may additionally be placed, when necessary, outside of the second conductive element 142D of the artificial medium 140. The second insulation layer 170 may also be a material identical with or different from a material of the first insulation layer 125. Moreover, the second insulation layer 170 may assume a thickness that is identical with or different from the thickness of the first insulation layer 125. When required, the metal plate 190 may additionally be placed outside the second insulation layer 170.

The RFID tag 100 having a thickness of; for instance, about 1 mm, is produced through the foregoing processes.

(Another Method for Manufacturing the RFID Tag of the Present Invention)

The second method for manufacturing the RFID tag of the present invention is now described.

Figure 23:
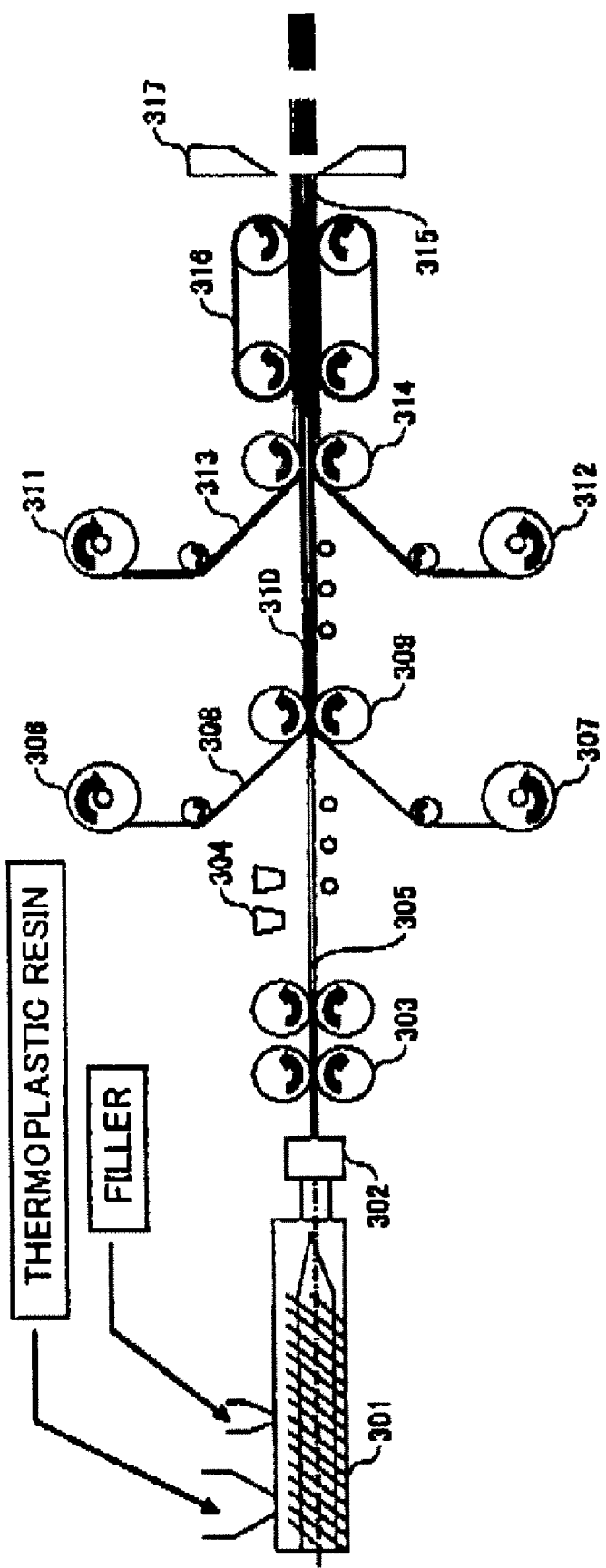
FIG. 23 is a drawing showing another example method for manufacturing the artificial medium of the present invention.

Under the manufacturing method, the same processes (i.e., steps S1 to S10) also proceed up to fabrication of an antenna element. However, the second manufacturing method is characterized in that the artificial medium 140 having the first insulation layer 125 and the second insulation layer 170 is manufactured in a so-called "continual" manner. The characteristic is hereunder described by reference to FIG. 23. FIG. 23 is a view schematically showing a flow of another method for manufacturing the artificial medium of the present invention.

First, a thermoplastic resin (e.g., SPS) and filler (e.g., strontium titanate ($SrTiO_3$)) particles, which act as a constituent material of the dielectric layer 150 of the artificial medium, are introduced into a double spindle extruder 301 having a screw diameter of 30 mm by way of a feeder. A mixed ratio by weight is; for instance, 2:8 (a thermoplastic resin: a filler). An interior of the double spindle extruder 301 is set to a predetermined temperature (e.g., 280° C.). The introduced material is conveyed while being uniformly kneaded in the double spindle extruder 301.

A shaping dice 302 is placed at an exit end of the double spindle extruder 301, and the melted, introduced material is extruded into a sheet having a thickness of; for instance, 0.2 mm, by means of the shaping dice 302. An extrusion rate is; for instance, 200 m/sec. Subsequently, the sheet is cooled and solidified by a cooling roller 303 and a cooling blower 309, whereby a dielectric sheet 305 is formed.

A metallized pattern sheet 308 (having a thickness of; for instance, 20 µm) previously cut into a predetermined width is fed to an upper side of the dielectric sheet 305 from an upper bobbin 306 and to a lower side of the same from a lower bobbin 307. An interior surface of each of the metallized pattern sheets 308 may also be coated with a heat-resisting-rubber-based adhesive. In this case, the metallized pattern sheet 308 can be temporarily fixed to each of the upper and lower sides of the dielectric sheet 305 and, therefore, a problem of misalignment of the metallized pattern sheets 308, which would otherwise arise during conveyance of the dielectric sheet 305, can be prevented.

Subsequently, The dielectric sheet 305 and the metallized pattern sheets 308 placed on the upper and lower surfaces thereof are pressed while passing through press rollers 309, thereby being integrated into a single piece. An artificial medium sheet 310 with conductive elements placed on upper and lower sides of a dielectric layer can thus be produced.

A spacer (insulation) sheet 313 previously cut into a predetermined width is fed to the upper surface of the artificial medium sheet 310 from an upper bobbin 311 and to the lower surface of the same from a lower bobbin 312. The spacer (insulation) sheet 313 may also be formed from; for instance, an acrylonitrile butadiene styrene copolymer (an ABS resin) internally having a microfoam structure. An interior surface of each of the spacer (insulation) sheets 313 may also be coated with a heat-resisting-rubber-based adhesive as in the case of the metalized pattern sheet 308.

The artificial medium sheet 310 and the spacer (insulation) sheets 313 placed on the upper and lower surfaces of the artificial medium sheet are pressurized and integrated into a single piece when passing between press rollers 314. A laminate sheet material 315 with the spacer (insulation) sheets provided on the upper and lower surfaces of the metalized pattern sheet can thereby be produced.

Subsequently, the laminate sheet material 315 is pulled by means of a take-off machine 316 and cut into a desired length by means of a cutter 317.

The sheet material 315 in which the insulation layers 125 and 170 are placed one on each of the upper and lower conductive elements implemented respectively on the upper and lower surfaces of the artificial medium can be produced through the foregoing processes. The RFID tag 100 of the present invention can subsequently be manufactured in the process pertaining to step S130; namely, the process for coupling the antenna element to one side of the sheet material.

The above description has provided an explanation about the method for manufacturing the RFID tag of the present invention by means of taking the RFID tag 100 shown in FIG. 1 as an example. However, it is manifest to those skilled in the art that the RFID tag 400 shown in FIGS. 14 and 15 can be formed by means of a similar method.

In this case, the first and second parasitic elements are fabricated one on each surface of the dielectric layer of the artificial medium by means of a method analogous to the method for forming the first and second conductive elements (e.g., a printing method or a method for placing a pattern sheet) or another method.

As mentioned above, in the case of the RFID tag 400, capacitive coupling increases as a result of placement of the first and second parasitic elements. Therefore, it is possible to control the input impedance achieved at an operating frequency band of the finally-obtained REID tag 400 in an easier manner so as to fall within a "desired range" by means of controlling dimensions (e.g., the width Wp, or the like) of the first and second parasitic elements.

EMBODIMENTS

Embodiments of the present invention are hereunder described

First Embodiment

An RFID tag having the configuration shown in FIGS. 14 and 15 was manufactured by preproduction, and characteristics of the thus-manufactured RFID tag were evaluated (First Embodiment).

In the RFID tag of the first embodiment, the full length La of a conducive antenna pattern 423 of an antenna element 420 was set to 94 mm, and the width Wa of the same was set to 16 mm. The thickness of the antenna pattern 423 was set to 10 μm. The thickness of the antenna substrate 422 (formed from a PET film) was set to 0.038 mm.

A dielectric substance [AR1000 (Product Name) manufactured by Arlon Inc.] having a thickness of 0.635 mm and a relative permittivity Er of 9.6 was used for the first insulation layer 425.

A dielectric substance [AR1000 (Product Name) manufactured by ArlonInc.] having a thickness of 0.254 mm and a relative permittivity ∈r of 9.6 was used for the dielectric layer of the artificial medium 440. A conductor having a length Lt of 45 mm in the direction X and a width Wt of 50 mm in the direction Y was used for both the first conductive element 442U and the second conductive element 442D. The conductive elements 442U and 442D were positioned so as to be aligned to each other along their thicknesswise directions (a feed point of the antenna element 420 is set at the center of the XY plane of the conductive elements).

Each of the first and second parasitic elements 445U and 445D had a width Wp of 15 mm and a length Lp of 50 mm. As shown in FIGS. 14 and 15, the first parasitic elements 945U were positioned so as to be situated one on each side of the second conductive element 442U when viewed in the direction Y. Likewise, the second parasitic elements 495D were disposed one on each side of the second conductive element 442D when viewed in the direction Y. A width "g" of a gap between the conductive element 442U (442D) and the parasitic elements 495U (445D) was set to 7.5 mm. The parasitic elements 445U and 445D are arranged so as to be positionally aligned to each other in their thicknesswise direction. The first conductive element 442U, the second conductive element 442D, the first parasitic elements 445U, and the second parasitic elements 445D each were set so as to assume a thickness of 10 μm.

A dielectric substance (TCL-W-596 manufactured by Kyocera Corporation) having a thickness of 0.15 mm and a relative permittivity Er of 3.3 was used for the second insulation layer 470.

An adhesive (a relative permittivity ∈r of 2.6) having a thickness of 60 μm was interposed between the artificial medium 440 and the first insulation layer 425 and between the artificial medium 440 and the second insulation layer 470, thereby bonding the members together.

Figure 24:
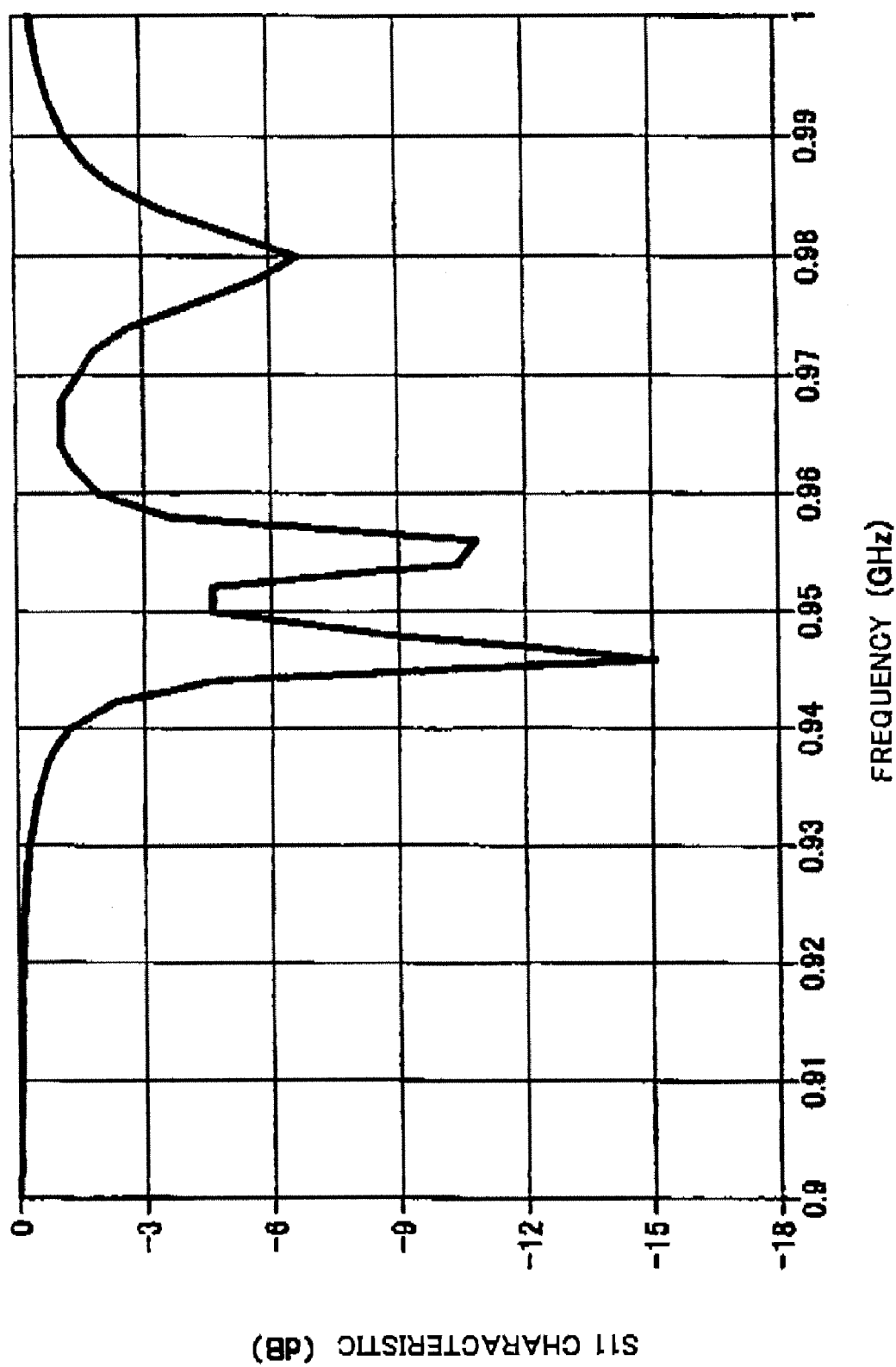
FIG. 24 is a drawing showing an example characteristic of the first embodiment of the present invention.

FIG. 24 shows an analysis result (frequency dependence of a return loss S11 of the input impedance) yielded by use of the RFID tag of the first embodiment. An electromagnetic field simulator Microwave Studio (Product Name) based on a Finite Integrate technique (Finite Integration Technique) was used in analysis.

It is understood that the return loss S11 significantly falls below −5 dB in a frequency range from about 945 MHz to about 955 MHz and that a highly superior characteristic is yielded.

Second Embodiment

The resin sheet making up the dielectric layer of the artificial medium of the present invention was produced as below.

There were prepared 5 grams of syndiotactic polystyrene (SPS) as a thermoplastic resin. Further, 29 grams of barium strontium titanate (BST) particles were prepared as a filler. A composition ratio of barium titanate to strontium was 8:2. In order to remove moisture from the thermoplastic resin (SPS) and the filler particles (BST), they were subjected to pretreatment in a temperature range of 80° C. for 24 hours before use.

The thermoplastic resin and the filler particles were kneaded with a kneading machine (or a mixer) under the following method.

First, the thermoplastic resin was fed to the kneading machine. The number of revolutions of the kneading machine was not limited to a particular number; for instance, 100 rpm or thereabouts. The kneading machine was previously held at a predetermined temperature (e.g., 300° C.), and the thus-fed thermoplastic resin was fully melted after several minutes.

Next, the filler particles were fed to the kneading machine separately several times and additionally kneaded. A quantity of filler particles to be fed was controlled in such a way that a fraction by weight comes to 85% or that a volume fraction comes to 50%.

Subsequently, the mixture was cooled to a room temperature and press-molded at a contact pressure of 20 MPa by use of a pressing machine held at 300° C., thereby producing a resin sheet having filler particles uniformly dispersed within a matrix of thermoplastic resin.

Therefore, there was produced a resin sheet having a relative permittivity of 16 and a dielectric loss (tan δ) of 0.003. The thickness of the resin sheet was 0.2 mm.

Third Embodiment

The artificial medium of the present invention was manufactured as follows.

First, the resin sheet that is to become a dielectric layer was produced along the following procedures.

There were prepared 5 grams of syndiotactic polystyrene (SPS) as a thermoplastic resin. Further, 25 grams of strontium titanate ($SrTiO_3$) particles were prepared as a filler.

In order to remove moisture from the thermoplastic resin (SPS) and the filler particles ($SrTiO_3$), they were subjected to pretreatment in a temperature range of 80° C. for 24 hours before use.

The thermoplastic resin and the filler were introduced into the double spindle extruder having a screw diameter of 30 mm by way of the feeder. A mixed ratio by weight was 2:8 (a thermoplastic resin: a filler). The interior of the double spindle extruder was set to a predetermined temperature (280° C.). The introduced material was conveyed while uniformly kneaded in the double spindle extruder.

A shaping dice is disposed on the exit end of the double spindle extruder, and the melted introduced material was extruded into a sheet having a thickness of 0.2 mm by means of the shaping dice. The extrusion rate was 20 mm/sec. Subsequently, the sheet was cooled and solidified by means of the cooling rollers and the cooling blower, thereby producing a resin sheet.

Next, the metalized pattern sheet (having a thickness of 20 μm) previously cut into a predetermined width was fed to an upper surface of the resin sheet from an upper bobbin and a lower surface of the same from a lower bobbin. A heat-resisting-rubber-based adhesive material was applied over an interior surface of each of the metalized pattern sheets.

Subsequently, the resin sheet and the metalized pattern sheets placed on both surfaces thereof were pressurized while passing through the press rollers, to thus be integrated into a single piece. An artificial medium sheet having the conductive elements placed respectively on the upper and lower surfaces of the dielectric layer could thereby be obtained.

Next, a spacer (insulation) sheet previously cut into a predetermined width was fed to an upper surface of the artificial medium sheet from the upper bobbin and a lower surface of the same from the lower bobbin. The spacer (insulation) sheet is formed from; for instance, an acrylonitrile butadiene styrene copolymer (an ABS resin) internally having a microfoam structure. An interior surface of each of the spacer (insulation) sheet was also coated with a heat-resisting-rubber-based adhesive as in the case of the foregoing metalized pattern sheet.

The resin sheet and the spacer (insulation) sheets placed on the upper and lower surfaces of the resin sheet are pressurized and integrated into a single piece when passing between press rollers. A laminate sheet material with the spacer (insulation) sheets provided on the upper and lower surfaces of the metalized pattern sheet can thereby be produced.

Subsequently, the laminate sheet material was pulled by means of a take-off machine and cut into a desired length by means of a cutter.

The sheet material in which the insulation layers are placed one on each of the upper and lower conductive elements implemented respectively on the upper and lower surfaces of the artificial medium could be produced through the foregoing processes. An RFID tag of the present invention was subsequently manufactured by coupling antenna element to one side of the sheet material.

INDUSTRIAL APPLICABILITY

The present invention can be utilized for an RFID tag, or the like, using the RFID technique.

Entire subject matters of specifications, claims, drawings, and abstracts of Japanese Patent Application No. 2008-200238 filed on Aug. 1, 2008 in Japan, Japanese Patent Application NO. 2008-285843 filed on Nov. 6, 2008 in Japan are cited and taken as disclosures of the specification of the present invention.

DESCRIPTION OF REFERENCE NUMERALS AND SIGNS

| | |
|---|---|
| 1 | RELATED ART ARTIFICIAL MEDIUM |
| 2 | DIELECTRIC LAYER |
| 3 | SPLIT RING |
| 4 | CONDUCTIVE PLANE |
| 5 | ELECTROMAGNETIC WAVE |
| 6 | SEPARATED PORTION |
| 100 | RFID TAG OF THE INVENTION |
| 105 | ELECTROMAGNETIC WAVE |
| 110 | IC CHIP |
| 120 | ANTENNA ELEMENT |
| 122 | ANTENNA SUBSTRATE |
| 123 | ANTENNA PATTERN |
| 125 | FIRST INSULATION LAYER |
| 140 | ARTIFICIAL MEDIUM OF THE INVENTION |
| 142U, 142D | CONDUCTIVE ELEMENT |
| 150 | DIELECTRIC LAYER |
| 170 | SECOND INSULATION LAYER |
| 180a, b, c | ELECTRIC CURRENT |
| Ia | LOOP CURRENT |
| 190 | MOUNT TARGET |
| 301 | DOUBLE SPINDLE EXTRUDER |
| 302 | SHAPING DICE |
| 303 | COOLING ROLLER |
| 304 | COOLING BLOWER |
| 305 | DIELECTRIC LAYER SHEET |
| 306 | UPPER BOBBIN |
| 307 | LOWER BOBBIN |
| 308 | METALLIZED PATTERN SHEET |
| 309 | PRESS ROLLER |
| 310 | ARTIFICIAL MEDIUM SHEET |
| 311 | UPPER BOBBIN |
| 312 | LOWER BOBBIN |
| 313 | SPACER SHEET |
| 314 | PRESS ROLLER |
| 315 | LAMINATE SHEET MATERIAL |
| 316 | TAKE-OFF MACHINE |
| 317 | CUTTER |
| 400 | SECOND RFID TAG |
| 420 | ANTENNA ELEMENT |
| 422 | ANTENNA SUBSTRATE |
| 423 | ANTENNA PATTERN |
| 425 | FIRST INSULATION LAYER |
| 440 | ARTIFICIAL MEDIUM |
| 442U | FIRST CONDUCTIVE ELEMENT |
| 442D | SECOND CONDUCTIVE ELEMENT |
| 445U | FIRST PARASITIC ELEMENT |
| 445D | SECOND PARASITIC ELEMENT |
| 450 | DIELECTRIC LAYER |
| 470 | SECOND INSULATION LAYER |
| 490 | MOUNT TARGET |

The invention claimed is:

1. An RFID tag comprising:
   an antenna element having an antenna substrate equipped with an IC chip and a conductor pattern;
   an artificial medium; and
   a first insulation layer interposed between the antenna element and the artificial medium, wherein
   the artificial medium has a single first conductive element placed on an upper surface of a dielectric layer and a single second conductive element placed an a lower surface of the dielectric layer.

2. The RFID tag according to claim 1, wherein the first and second conducive elements assume a substantially identical shape.

3. The RFID tag according to claim 1, wherein at least one of the conductive elements assumes an oblong shape or a square shape.

4. The RFID tag according to claim 1, wherein the first insulation layer and/or the dielectric layer of the artificial medium is formed from a material having a relative permittivity ∈r of 5 or more.

5. The RFID tag according to claim 1, wherein:
the antenna element has a center region where the IC chip is placed and two mutually-opposing end regions except the center region;
the artificial medium further has first conductive parasitic elements placed on the upper surface of the dielectric layer and second conductive parasitic elements placed on the lower surface;
the first parasitic elements are placed so as to correspond to the two mutually-opposing end regions of the antenna element by way of a gap between the first conductive element and the first parasitic elements when viewed in a direction parallel to a thicknesswise direction of the RFID tag; and
the second parasitic elements are placed so as to correspond to the two mutually-opposing end regions of the antenna element by way of a gap between the second conductive element and the second parasitic elements when viewed in a direction parallel to the thicknesswise direction of the RFID tag.

6. The RFID tag according to claim 5, wherein the first and second parasitic elements assume an oblong shape or a square shape.

7. A method for manufacturing an RFID tag comprising a step of providing an antenna element having an antenna substrate equipped with an IC chip and a conductor pattern, a step of providing an artificial medium, and a step of stacking the antenna element and the artificial medium by way of a first insulation layer, wherein
the artificial medium has a single first conductive element placed on an upper surface of a dielectric layer and a single second conductive element placed on a lower surface of the dielectric layer; and
the method includes:
a step of controlling a ratio of a length Lt of the first conductive element of the artificial medium to a width Wt of the same (Wt/Lt), thereby controlling fluctuations in a real part and an imaginary part of an input impedance occurred in an operating frequency band of the RFID tag so as to fall within a predetermined range; and
a step of controlling a ratio (Lt/La) of an entire length La of the antenna element to the length Lt of the first conductive element of the artificial medium, thereby controlling a phase angle of the input impedance achieved in the operating frequency band of the RFID tag so as to fall within a predetermined range.

8. The method for manufacturing an RFID tag according to claim 7, wherein the step of controlling the fluctuations in the real part and the imaginary part of the input impedance occurred in the operating frequency band of the RFID tag so as to fall within the predetermined range and the step of controlling the phase angle of the input impedance achieved in the operating frequency band of the RFID tag so as to fall within the predetermined range are a step of letting the input impedance of the RFID tag approximate to an input impedance achieved when only the antenna element is provided.

9. An RFID tag comprising:
an antenna element having a substrate provided with an IC chip and an antenna pattern;
an artificial medium having a single first conductive element placed on an upper surface of a dielectric layer and a single second conductive element placed on a lower surface of the dielectric layer;
a first insulation layer interposed between the antenna element and the artificial medium; and
a second insulation layer placed on an opposite side of the artificial medium with respect to its side equipped with the antenna element, wherein
a ground plane is formed on an opposite surface of the second insulation layer with respect to its surface facing the artificial medium.

10. A method for controlling an impedance of an antenna element of an RFID tag, in which the RFID tag has an artificial medium interposed between first and second insulation layers and the antenna element provided on an opposite side of the first insulation layer with respect to its side provided with the artificial medium, wherein
the artificial medium has first and second conductive elements with a dielectric layer sandwiched therebetween; and
the method includes a step of controlling an impedance by changing dimensions of the first or second conductive element.

* * * * *